United States Patent [19]

Woodward

[11] Patent Number: 4,914,664
[45] Date of Patent: Apr. 3, 1990

[54] TUNABLE DYE LASER WITH SUPPRESSED FREQUENCY SHIFT ANOMALIES

[75] Inventor: Ben Woodward, Santa Clara, Calif.

[73] Assignee: Spectra Physics, Inc., San Jose, Calif.

[21] Appl. No.: 260,909

[22] Filed: Oct. 21, 1988

[51] Int. Cl.$^4$ .................................................. H01S 3/10
[52] U.S. Cl. .................................... 372/20; 372/53; 372/105; 372/33
[58] Field of Search ..................... 372/53, 20, 33, 105

[56] References Cited

U.S. PATENT DOCUMENTS

| | | | |
|---|---|---|---|
| 3,083,507 | 9/1976 | Tang et al. | 372/20 |
| 3,868,592 | 2/1975 | Yarborough et al. | 372/20 |
| 4,208,636 | 7/1980 | German | 372/20 |
| 4,268,800 | 5/1981 | Johnston, Jr. et al. | 372/94 |
| 4,569,053 | 2/1986 | Roullard, III et al. | 372/20 |
| 4,734,911 | 3/1988 | Bruesselbach | 372/99 |

OTHER PUBLICATIONS

Lavold et al., IEEE Journal of Quantum Electronics, QE-21(3):202-207, (1985).
Bloom Journal of the Optical Society of America, 64(4):447-452, (1974).
November et al., Applied Optics, 23(14):2333-2341, (1984).
Holtom et al., IEEE Journal of Quantum Electronics, QE-10(8):577-579, (1974).
Preuss et al., Applied Optics, 19(5):702-710, (1980).

Primary Examiner—Leon Scott, Jr.
Attorney, Agent, or Firm—Skjerven, Morrill, MacPherson, Franklin & Friel

[57] ABSTRACT

An improved dye laser having a birefringent tuning filter comprised of one or more birefringent plates wherein each plate is oriented at Brewster's angle to the resonant light beam and is an integer multiple of the thickness of the thickness of the first plate characterized by the fact that the thickness of the first plate is chosen using a new tuning relationship so that a single order tuning curve covers a tuning range of interest. This single tuning curve is almost linear throughout the tuning range and has a tuning angle at the center of the range of approximately five degrees. Also, the tuning curve has a slope throughout the tuning range which provides sensitivity of selected wavelength to tuning angle which is neither too great nor too small. A further refinement in the structure is a non birefringent polarizing plate at Brewster's angle which increases the losses imposed upon light passing therethrough which is polarized at other than Brewster's angle. These losses extinguish the laser when tuning anomalies occur near the ends of the tuning range where the wavelength and polarization suddenly jump to different values.

23 Claims, 7 Drawing Sheets $$\lambda = \frac{\Delta N\, T}{M \sin\theta} \left[ 1 - \frac{\sin^2\theta}{2 N^2}(1 + \sin 2\phi) \right]$$

WHERE $\Delta N$ = DIFFERENCE IN INDEX OF REFRACTION FOR TWO AXES OF BIREFRINGENT PLATES.

T = THICKNESS OF FIRST BIREFRINGENT PLATE.

M = THE INTEGER DEFINING ANY PARTICULAR $\phi$ LOSS ORDER CURVE.

$\theta$ = THE ANGLE BETWEEN THE INCIDENT RAY AND THE NORMAL TO THE SURFACE.

N = THE AVERAGE INDEX OF REFRACTION OF THE BIREFRINGENT PLATES.

$\phi = \alpha + \frac{\pi}{4}$ WHERE $\alpha$ = THE ANGLE BETWEEN THE PROJECTION OF THE OPTIC AXIS ON THE SURFACE OF THE BIREFRINGENT PLATE AND THE PLANE OF INCIDENCE CONTAINING THE INCIDENT RAY AND THE NORMAL TO THE SURFACE.

FIGURE 5

TUNABLE DYE LASER WITH SUPPRESSED FREQUENCY SHIFT ANOMALIES

BACKGROUND OF THE INVENTION

The invention relates to the field of continuous-wave, and synchronously pumped mode locked dye lasers, and, more particularly, to the field of birefringent tuning plates and tuning mechanisms in general for such lasers.

Continuous-wave dye lasers and birefringent plates for tuning the wavelength of lasing activity are known. However, heretofore, there has been no closed form equation for relating the wavelength of minimum loss, i.e., the lasing wavelength, to the tuning angle of the tuning mechanism although, such an equation could be derived from a paper by Lovold, et al. to be discussed in more detail below, at least for the simple cases discussed herein. Also, it has been noticed in prior art laser designs that tuning anomalies consisting of sudden unpredictable jumps in the wavelengths of lasing activity sometimes occur near the ends of the tuning range. To better understand these problems, some background on lasers and the tuning mechanism for same is in order.

A laser is a device that uses the principle of amplification of electromagnetic waves by stimulated emission of radiation and operates in the infrared, visible, or ultraviolet region. The term "laser" is an acronym for light amplification by stimulated emission of radiation, or a light amplifier. However, just as an electronic amplifier can be made into an oscillator by feeding appropriately phased output back into the input, so the laser light amplifier can be made into a laser oscillator, which is really a light source. Laser oscillators are so much more common than laser amplifiers that the unmodified word "laser" has come to mean the oscillator, while the modifier "amplifier" is generally used when the oscillator is not intended.

The process of stimulated emission can be described as follows. When atoms, ions, or molecules absorb energy, they can emit light spontaneously (as an incandescent lamp) or they can be stimulated to emit light energy by a light wave. The stimulated emission is the opposite of stimulated absorption, where unexcited matter is stimulated into an excited state by a light wave. If a collection of atoms is prepared (pumped) so that more are initially excited than unexcited, then an incident light wave will stimulate more emission that absorption, and there is net amplification of the incident light beam. This is the way a laser amplifier works.

A laser amplifier can be made into a laser oscillator by arranging suitable mirrors on either end of the amplifier. These are called the resonator and are sometimes referred to as defining the resonant cavity within which the lasing material is found. Thus, the essential parts of the laser oscillator are an amplifying medium, a source of pump power, and a resonator. Radiation that is directed straight along the axis of the resonator cavity bounces back and forth between the mirrors and can remain in the resonator long enough to build up a strong oscillation. Radiation may be coupled out of the resonator cavity by making one mirror partially transparent so that part of the amplified light can emerge through it. The output wave, like most of the waves being amplified between mirrors, travels along the axis and is thus very nearly a plane wave.

One way to achieve population inversion is by concentrating light as pump energy onto the amplifying medium. Alternatively, lasers may be used to optically pump other lasers. For example, powerful continuous wave ion lasers can pump liquid dyes to lase, yielding watts of tunable, visible, and near visible coherent radiation. Laser light is coherent in that all light of a given wavelength is in phase by virtue of the stimulated emission nature of generation of the light.

Liquid lasers have structures generally like those of optically pumped solid-state lasers, except that the liquid is generally contained in a transparent cell. Some liquid lasers make use of rare-earth ions and suitable dissolved molecules, while other make use of organic dye solutions. The dyes can lase over a wide range of wavelengths, depending upon the composition and concentration of the dye or solvent. Thus, tunability is obtained throughout the visible, and out to a wavelength of about 1 micron. Fine adjustment of the output wavelength can be provided by using a diffraction grating or other dispersive element in place of one of the laser mirrors or somewhere in the cavity between the mirrors. Where a diffraction grating is substituted for one of the mirrors, the grating acts as a good mirror for only one wavelength, which depends on the angle at which it is set. With further refinements, liquid-dye lasers can be made extremely monochromatic, as well as broadly tunable.

In the prior art, prisms and gratings are currently widely used with dye lasers as tuning elements. These devices are examples of spatially dispersive selectors. The attainment of high resolution with these devices requires large spot sizes at the tuning element and creates serious difficulties in the design of other parts of the laser. Tilted etalons can be used to give narrow bandwidths at particular points in the spectrum, but any one etalon has a very limited tuning range. Electrooptically tuned Lyot filters have also been used to tune laser output wavelength.

Tilted birefringent plates have also been successfully demonstrated for use as highly tunable, narrow-band selection devices. This is taught in Bloom, "Modes of a Laser Resonator Containing Tilted Birefringent Plates", *Journal of the Optical Society of America*, Vol. 64, No. 4, pp. 447-452 (April 1974). The resonator in such a device contains at least one pair of surfaces oriented at Brewster's angle to the incident light rays, and a birefringent plate that is tilted and whose optic axis is out of the plane defined by the p-polarization of the Brewster windows. The term p-polarization refers to polarization where the electric vector of the light lies in the plane of the incident ray and the normal to the surface and is the normal mode of operation of such lasers. The polarization of light is the direction of its electric vector as opposed to the orientation of the magnetic vector. It is necessary to let the plate be tilted at Brewster's angle, because at that angle there is no reflection from an incident p-polarized beam.

Birefringence is the property of some materials which are homogeneous but anisotropic to have a different index of refraction for light traveling through the material in different directions. That is, the velocity of a light wave in such material is not the same in all directions. In such materials, two sets of Huygens wavelets propagate from every wave surface, one set being spherical and other being ellipsoidal. A consequence of this property of anisotropic crystals is that a ray of light striking such a crystal at normal incidence is broken up into two rays as it enters the crystal. The ray that corresponds to wave surfaces tangent to the spherical wavelets is undeviated and is called the "ordinary" ray. The ray corresponding to the wave surfaces tangent to the ellipsoids is deviated, even though the incident ray is normal to the surface, and is called the "extraordinary" ray. If the crystal is rotated about the incident ray as an axis, the ordinary ray remains fixed, but the extraordinary ray revolves around it. Furthermore, for angles of incidence other than zero degrees, Snell's law holds for the ordinary but not for the extraordinary ray, since the velocity of the latter is different in different directions.

The index of refraction for the extraordinary ray is therefore a function of direction. There is always one direction in such a crystal for which there is no distinction between the ordinary and extraordinary rays. This direction is called the optic axis.

Brewster's angle, sometimes also called the polarizing angle, is the angle of incidence for which the reflected ray and the refracted ray are perpendicular to each other. When an incident light beam strikes a boundary between two materials having two different indices of refraction, part of the incident light energy is reflected in a reflected beam and part of it is refracted through the second material. The perpendicular relationship between the reflected ray and the refracted ray is only true when the angle of incidence of the incoming ray is equal to Brewster's angle. This is an angle between the direction vector of the incoming light beam and the normal to the surface defined by the junction between the materials of two different indices. When the incident ray is at Brewster's angle, the angle of refraction becomes the complement of the angle of incidence, so that the sine of the angle of refraction is equal to the cosine of the angle of incidence.

Wavelength selection and tuning through the use of a birefringent plate in the resonator cavity comes about because the plate defines two different axes of retardation for laser energy whose electric vector is polarized along these axes. That is, retardation is the phase difference which builds up between the ordinary and extraordinary ray as they travel through the birefringent material at different speeds. When the retardation corresponds to an integral number of full wavelengths, the laser operates as if the plates were not there, i.e., in the p-polarization of the Brewster surfaces. At any other wavelength, however, the retardation is not an integer number of wavelengths and the laser mode polarization is shifted by the plate and suffers losses by reflection of energy out of the cavity with each encounter with a surface at Brewster's angle.

Tunability is achieved by rotating the birefringent plate in its own plane, because this changes the included angle between the optic and laser axes (called the tuning angle) and, hence, the effective principal refractive indices of the plate are angularly rotated. The losses imposed by the birefringent plate on wavelengths whose retardation is other than an integer multiple of one wavelength therefore prevent lasing action. This is because lasing action only occurs when the output energy exceeds the input energy, and this condition will be not be true at wavelengths for which the losses are too great. Therefore, lasing only occurs at a particular wavelength or group of wavelengths within the selected range having phase retardation which is at or near an integer multiple of one wavelength.

In a paper by Holtom and Teschke, "Design of a Birefringent Filter for High-Power Dye Lasers", *IEEE Journal of Quantum Electronics*, Vol. QE-10, No. 8, pp. 577–579 (August 1974), the design of birefringent filters for the suppression of sidebands in dye lasers was discussed. The paper explains that in using a birefringent filter for wavelength tuning of a continuous-wave dye laser, several crystalline quartz (quartz is birefringent) plates are inserted within the laser cavity at Brewster's angle. These laser plates both retard and polarize light passing through the cavity. It is explained that this is a variation of the Lyot filter which has separate retarders and polarizers. The tuning of such a laser structure is accomplished by rotating the assembly of quartz plates about an axis normal to the surface of the quartz plates.

The advantages of such a filter are explained to be low loss, high dispersion, small physical size, resistance to damage at high intensity, and the absence of any reflecting surfaces normal to the laser beam. However, for such a filter to be suitable for a high-gain dye laser, the lasing and transmission of light at frequencies other than at the desired passband must be reduced to approximately 10–20%. That is, in high-gain lasers, even though there are losses imposed on light outside the desired passband, lasing action can still occur unless the loss imposed on light outside the passband is sufficiently large to prevent the lasing criteria from being met. The problem addressed by this reference is that of incomplete polarizing leading to undesirable sideband operation. That is, incomplete polarizing action of the Brewster surfaces of the quartz plates leads to sideband transmissions. Attenuation of these sideband peaks may be increased by adding glass plates to the stack of quartz disks in order to increase the polarizing efficiency. This increased polarizing efficiency causes greater losses for light having the frequencies in the sidebands, thereby suppressing these undesired modes of operation.

In a paper by November and Stoffer, "Derivation of the Universal Wavelength Tuning Formula for a Lyot Birefringent Filter", *Applied Optics*, Vol. 23, No. 4, pp. 2333–2341, the authors discuss the nature of Lyot filters and their function in tuning to provide variable monochromatic transmission of light at wavelengths spanning the useful operating range of the filter. The authors explain that a Lyot birefringent filter is functionally a series of tuning elements each of which rotates synchronously with the other tuning elements so that the whole collection of tuning elements act as a fixed unit. Each tuning element has three optical components: an entrance polarizer, a birefringent crystal, and a quarter-wave plate. The entrance polarizer is fixed with respect to the birefringent crystal so that it divides the light in equal intensity between the two axes of different refractive index in the birefringent crystal while preserving one temporal phase; the phase of the light wave is advanced in the crystal's extraordinary axis over its ordinary axis in the birefringent crystal. The quarter-wave plate following the birefringent crystal changes the phase-lag or differential retardation modulo pi into a specific angle of linear polarization. Those wavelengths of light that experience a specific fractional differential retardation are selected by a following polarizer; usually this is the entrance polarizer of the next tuning element in the series.

The partial tuning formula given by November and Stoffer at page 2334 has been found experimentally by the applicant to be only partially correct. This paper does, however, give a nice background discussion of how the birefringent filter elements work. It is there stated that the linear polarizer that follows a tuning element shows maximum transmission at those wavelengths of light that experience a specific phase-delay modulo pi in passing through the birefringent crystal. The phase delay is the retardation of the crystal. The retardation is stated by the authors to be a function of the difference in refractive indices, i.e., the birefringence of the crystal, the thickness of the crystal, and the wavelength of the light. The transmission factor is stated to be a function of the phase delay and the angle between the tuning element and the following polarizer. As the tuning element rotates relative to the following polarizer, the maxima of transmission shifts in wavelength by the fraction of a fringe equal to the angle divided by pi. Each one-half rotation of the tuning element shifts the wavelength maxima of transmission through one full fringe and is said to span the spectral range of the tuning element.

In the Lyot design, the successive tuning elements are twice the respective thickness of the previous element at its nominal operating wavelength. All the tuning elements are rotated against following polarizers to provide maximum transmission through the tuning elements at a single wavelength in a process called "alignment". This single wavelength is called a tune solution and gives a profile shown in FIG. 1 of the paper authored by November and Stoffer. The multiple passbands are spaced by the free spectral range of the thinnest tuning element.

In another paper by Preuss and Gole, "Three-Stage Birefringent Filter Tuning Smoothly over the Visible Region: Theoretical Treatment and Experimental Design", *APPLIED OPTICS*, Vol. 19, No. 5, pp. 702-710 (March 1980), it is stated that the technique of frequency selection in a dye-jet laser takes advantage of the fact that a low-gain laser can operate only with a polarization that is transverse magnetic (TM) with respect to any intracavity elements oriented at Brewster's angle (windows, dye jets, or the birefringent plates, themselves). A single birefringent plate has the property of transforming the incident TM polarization into some elliptical polarization composed of both TM and TE (transverse electric) linear polarization components. Conventionally, a light wave has orthogonal electric and magnetic vectors, and its polarization is stated to be the direction of the electric vector. The authors go on to state that the power transformed from the TM mode into the TE mode is no longer available to stimulate emission in the lasing TM mode. If the power loss is sufficient, lasing will cease.

The power loss due to a birefringent filter is a function of the orientation of the birefringent plates as well as the frequency of the radiation passing through these plates. The thicknesses and orientations of the component plates in a birefringent filter are chosen so that there will be one frequency within the gain curve of the laser medium for which the polarization will be unaffected. Since this frequency component alone suffers the minimum loss, it will continue to lase while all other frequencies are suppressed. By changing the orientation of the filter, the frequency of minimum loss is changed and the laser is thereby tuned.

A useful filter must be efficient. As such, a filter tuned to the peak of the laser gain curve should cause little or no degradation of the output power. It is also important that the birefringent filter display smooth continuous tuning as the orientation of the device is gradually altered. The authors state that this latter quality appears to be lacking for certain wavelength regions in commercially available filters. The authors go on to state a relationship between the wavelength and various angles in a typical system. However, it has been found by the assignee hereof that this relationship does not fit experimental data, and is therefore suspect.

In another paper by Lovold, et al., "Frequency Tuning Characteristics of a Q-Switched Co:MgF$_2$ Laser", IEEE Journal of Quantum Electronics, Vol. QE-21, No. 13, March 1985, pp. 202-207, the authors present the most complete relationships of any known in the literature, covering the most general case where the optic axis can be at any arbitrary angle with respect to the plate normal. Because of the complexity of the relationships, a simple closed form equation cannot be derived and is not taught; moreover, the parameters are not all directly measurable. If the angle sigma is set to 90 degrees, then the relation can be shown to be the same as the relation shown in Appendix A (described more fully below), by making appropriate substitutions.

The authors claim that it is desirable for their laser to use birefringent plates with the optic axis at an angle of 35 degrees to the normal to achieve a high modulation depth; however, it is apparent that the tuning is a very steep function of the rotation angle, rho. In the dye laser cases considered in this application, steep tuning functions are undesirable. Another reason why it is undesirable to choose solutions described in this paper is that the design is very sensitive to errors in plate thickness; therefore, for both these reasons, solutions presented herein are restricted to the case where sigma equals 90 degrees and the optic axis is near −40 degrees to the plane of incidence.

There are several problems with the prior art continuous wave tunable dye lasers with respect to the prior art tuning structures. The first problem is that there is no accurate tuning equation which is available to predict the selected wavelength of lasing for a given angle of the tuning mechanism. At least one purported tuning equation has been put forth by the prior art as noted in the above discussion of the references. However, this tuning equation has been found by the applicant to not fit experimental data. The equations of the Lovold et al. reference are useful, but not specifically applicable to the cases of interest for a visible light dye laser.

The thickness of the thinnest element of the birefringent filter tuning structure determines the characteristic tuning curves of the tuning structure. One common thickness in the prior art for the thinnest element is approximately 0.33 mm. Another thickness that has been used in the prior art is 0.381 mm. Neither of these thicknesses alone provides a single mode curve for all dyes; for example, the 0.33 mm thickness requires two orders to cover the 800-900 nm range, but is satisfactory (has one order curve) in the 700-800 nm range. The opposite is true with the 0.381 mm thickness: that plate can tune over 800-900 nm on a single order curve, but not over 700-800 nm. The difficulty that this creates is that the operator must operate on one mode curve or another, and since no mode curve encompasses the entire range, such operators must operate on two mode curves to tune the laser throughout the entire range. This is inconvenient since it requires the operator to tune out to the extreme ends of one mode curve and then to turn the birefringent filter a complete revolution to get to the next mode curve before tuning can resume. This is both inconvenient and causes errors when operating near the end of either mode curve. As an example of these types of problems, sideband rejection is much worse at the large tuning angles which must be used to reach the ends of any particular tuning curve to reach another mode curve. If sideband rejection is insufficiently high, the laser may lase at unwanted frequencies. Therefore, a need has arisen for a structure for tuning a continuous wave dye laser smoothly through each of the various dye ranges on a single order curve.

There has therefore arisen a need for a method of predicting the tuning characteristics of particular structures based upon a tuning formula such that the appropriate thickness for birefringent tuning elements may be chosen to achieve single-mode curve tuning throughout the desired range with good linearity and good sensitivity. Without an accurate tuning formula, the designer of a laser is left to choose between an infinite number of thickness for the birefringent tuning plates. This requires a great deal of experimentation to find the proper thickness to achieve smooth, single-mode curve tuning throughout the desired range.

Another problem which has arisen in the prior art of continuous wave dye laser tuning is that of wavelength jump. It has been noted that at high pumping energies, when a continuous wave dye laser is tuned near the end of its tuning range, there occurs a shift in wavelength back toward wavelengths in the center of the tuning range. This is an undesirable feature, since the desired tuning characteristics of a CW dye laser are to smoothly tune throughout the range of operation with no discontinuities in the wavelength versus tuning angle relationship. When the ends of the tuning range are reached, it is desired that the laser simply go out, i.e., stop lasing. Therefore, there has arisen a need for a tuning structure for a CW dye laser which can eliminate these wavelength discontinuities near the end of the tuning range.

SUMMARY OF THE INVENTION

According to the teachings of the invention there is given herein a tuning equation for continuous wave dye laser and there is described a birefringent filter tuning structure with a thin first plate with thickness selected in accordance with the guidance of the tuning equation. The thickness is selected so as to provide a single mode curve which covers the entire range of interest. Also taught herein is a birefringent filter tuning structure with an additional glass polarizing element called a Brewster plate present within the resonator cavity at Brewster's angle to the laser beam. This additional Brewster plate serves the purpose of imposing additional losses upon light traveling within the resonator cavity having polarizations which are off the polarization of minimum loss selected by the tuning element. This additional Brewster plate has the effect of extinguishing the laser when the points at the end of the tuning curve are reached where the wavelength jumps back toward wavelengths in the center of the tuning range at high pumping energy. It has been noted experimentally that when this wavelength jump occurs, a similar jump in the polarization angle of the light at the new wavelength also occurs. Because the polarization changes away from the polarization of the desired wavelength, the additional Brewster plate imposes sufficient losses to negate the existence of the lasing criterion, thereby extinguishing the laser.

BRIEF DESCRIPTION OF THE DRAWINGS

FIG. 5 gives the tuning equation relating the wavelength of minimum loss at any particular tuning angle for the other conditions specified in the right side of the equation.

DETAILED DESCRIPTION OF THE PREFERRED EMBODIMENT

Figure 1:
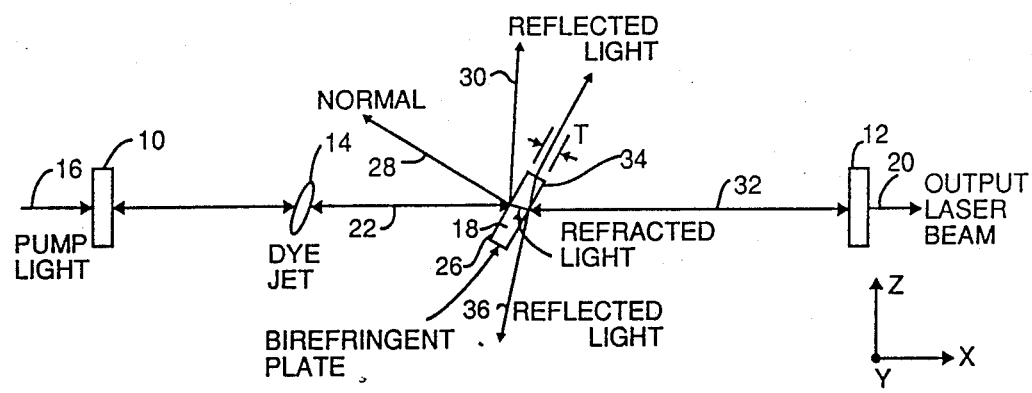
FIG. 1 shows a diagram of a typical prior art dye jet laser with a birefringent plate tuning mechanism.

Referring to FIG. 1, there is shown a diagram of a typical prior art dye laser using a birefringent plate tuning element. The dye laser is constructed having at least two mirrors 10 and 12 defining a resonating cavity therebetween. Dye jet 14 is selected to have lasing properties when pumped with sufficient energy, and is oriented in the cavity at Brewster's angle to the axis of the light beam. Pump energy, shown at 16 in the form of a light beam from another laser or other suitable energy source, enters the resonating cavity through partially silvered mirror 10.

When the pump light 16 illuminates the dye jet 14, population inversion occurs. That is, many of the dye jet molecules are excited to higher energy states. When any molecule decays to a lower energy state, the energy lost in this process is emitted as a photon, i.e., light. This light bounces back and forth between the mirrors 10 and 12, and each time it passes through the dye jet 14 other molecules are stimulated to drop down in energy, thereby emitting other photons in the same phase as the photons passing through the dye jet. This process is called stimulated emission and is at the heart of the lasing process.

A birefringent plate 18 serves as a tuning element. The light emitted from the dye jet 14 is emitted at many different wavelengths. Generally speaking, it is desirable to tune the laser such that only light of a particular wavelength or in a very narrow band of wavelengths is emitted from the laser. Output laser light emerges from the resonating cavity through partially silvered mirror 12 and is shown at 20. The tuning of the laser shown in FIG. 1 is done by taking advantage of the fact that a low-gain laser can operate only with the polarization that is transverse magnetic (TM) with respect to any intracavity elements oriented at Brewster's angle. The birefringent plate 18 has the property of transforming the incident TM polarization energy into some elliptical polarization composed of both TM and TE (transverse electric) linear polarization components. The power transformed from the TM into the TE mode is no longer available to stimulate emission into the lasing TM mode. If the power loss is sufficient, lasing will cease.

The power loss caused by a birefringent filter is a function of the orientation of the birefringent plates as well as the wavelength and polarization of the radiation passing through these plates. Thicknesses and orientation of the component plates of the birefringent filter are chosen during the design process so that there will be at least one frequency within the gain curve of the laser medium for which the polarization and level of transmitted energy will be unaffected. That is, the wavelength selection during tuning of the laser comes about because of the orientation and thickness of the birefringent plate. Each birefringent plate defines two different axes of light transmission, each having a different index of refraction. This difference in index depending upon direction of travel causes different speeds of travel and results in differences in phase between light traveling along these axes. When the phase retardation corresponds to an integral number of full-wavelengths in the birefringent plates, the laser operates as if the plates were not there, i.e., the laser will continue to lase at the polarization which would exist if the birefringent plate 18 were not present. At any other wavelength, however, the laser mode polarization is shifted by the birefringent plate or plates 18 and suffers losses at the Brewster surfaces. Tunability is achieved by rotating the plate in its own plane, because this changes the included angle between the optic and the laser axes and, hence, the effective principal refractive indices of the birefringent plate 18. In other words, at the selected frequency or narrow band of frequencies wherein the retardation caused by the birefringent plate 18 is equal to one full wavelength retardation, minimum loss occurs in the laser cavity at the Brewster surfaces. This frequency component will continue to lase. All other frequency components have phase retardation imposed by the birefringent plate or plates 18 which is less than or more than an integer number of wavelengths. This causes losses at the Brewster surfaces which are sufficient to extinguish the lasing activity at these wavelengths because the lasing criterion is not met. By changing the orientation of the birefringent plate 18, i.e., rotating it about the axis defined by the resonating light beam 22, the frequency of minimum loss is altered, thereby tuning the laser.

In the prior art, the birefringent plate 18 is typically comprised of multiple birefringent plates. Typically, the first birefringent plate in the group is the thinnest (but the thinnest need not be the first), and all subsequent birefringent plates have thicknesses which are integer multiples of the thickness of the first plate. Often, the second plate is four times the thickness of the first plate. Each birefringent plate has its own tuning function which is the relationship between the transmission factor or loss imposed by the plate at each wavelength.

Figure 2:
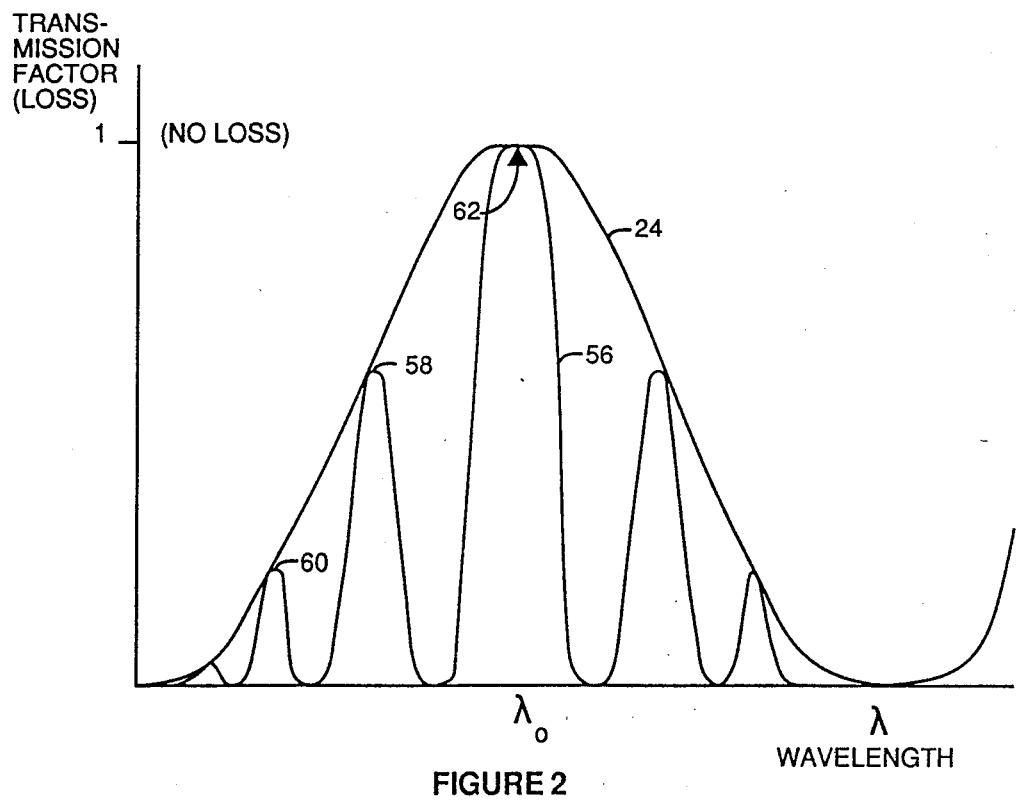
FIG. 2 shows the transmission function of a typical multiple birefringent tuning plate tuning mechanism illustrating the concepts of narrowing of the passband at the main peak and the resulting sidebands.

FIG. 2 is an illustration of the individual tuning transmission curves for a two-plate filter. In FIG. 2, curve 24 represents the transmission function of the first and thinnest birefringent plate. It will be noticed by a study of this curve that over a relatively broad band of wavelengths centered about the center frequency, lambda$_0$, the transmission factor is approximately 1. This means that for these wavelengths, the phase retardation imposed by the thinnest birefringent plate is an integer multiple of one wavelength or very close thereto and, therefore, very little loss is imposed by the birefringent plate on light passing therethrough.

Note that as the wavelength is altered either positively or negatively away from the center frequency, lambda$_0$, the transmission factor becomes less than 1. This means that at those wavelengths, losses are occurring such that the amount of light that emerges from the first, thinnest birefringent plate is less than the amount of light which was incident thereon.

The loss mechanism is as follows. Assume, for purposes of discussion, that the incident ray being considered is the incident ray 22 traveling from left to right along the X axis toward the birefringent plate 18 and impinging upon the first surface 26 thereof. The normal 28 to the surface 26 lies in the X-Z plane and the incident ray has its electric vector E aligned vertically in the X-Z plane and parallel to the Z axis. This is called p-polarization. The normal 28 of the surface 26 is at Brewster's angle to the incident ray 22. Because of this orientation and the p-polarization, none of the incident ray 22 is reflected along the path 30. Instead, all of the incident energy is refracted through the birefringent plate 18 and emerges as the ray 32.

As the incident ray travels through the birefringent plate 18, it is split into an ordinary ray and an extraordinary ray. Each of which travels at a different speed because of the difference in the index of refraction for the two different directions of propagation. This speed difference leads to a phase difference that develops and increases as the two rays travel through the plate. If the incident ray has the wavelength lambda$_0$, the phase of the ordinary and extraordinary ray (not shown) shifts, one relative to the other and will be different by some integral multiple of one wavelength when the rays emerge from the other side of the plate. This results in no change in the p-polarization and no losses by reflection imposed by the brewster surfaces.

There is only one direction in the crystal for which there is no distinction between the speed of travel for the ordinary and the extraordinary rays. This direction is called the optic axis.

As noted above, when the rays travel through the birefringent plate, the phase difference between the extraordinary and the ordinary rays becomes larger with increasing distance. This phase difference is called retardation. For a fixed wavelength, there will be a given distance or plate thickness wherein the phase retardation equals one complete wavelength. Likewise, there will be another thickness wherein the retardation is equal to two wavelengths. Likewise, there is a specific thickness for retardation equal to each integer multiple of one wavelength of the incident ray. For a different wavelength, these thicknesses are different.

If the thickness of the birefringent plate for a given wavelength is such that the phase retardation is equal to an integer multiple of one wavelength at that frequency, then the refracted light beam will have p-polarization when it reaches the second surface 34 of the birefringent plate. Since the incident light on the surface 34 is the refracted beam comprising the ordinary ray and the extraordinary ray, and since this refracted beam will have p-polarization, and since the surface 34 is at Brewster's angle relative to the refracted beam, there will be no reflection from the surface 34 representing loss. Therefore, no light will be lost from the laser beam 22 reverberating in the cavity along the X axis. Any reflection of light out of the beam 22 caused by a Brewster surface, or any other surface, represents a loss.

For wavelengths where the retardation during travel through the birefringent plate 18 is less than or more than an integer multiple of one wavelength at that frequency, the polarization of the refracted light beam as it impinges on surface 34 will be other than pure p-polarization. That is, there will be polarization components other than in the plane of incidence. Since only light polarized in the plane of incidence, i.e., p-polarization, will pass through the surface 34 without reflection, part or all of the light having non-p-polarization will be reflected out of the cavity at the surface 34 and will be lost. Any of the non-p-polarization light which emerges in the beam 32 will be reflected by the mirror 12 back toward the surface 34 and further losses by reflection will occur at surface 34 for those light components having non-p-polarization. This reflected light is represented by the light beam 36.

Figure 3:
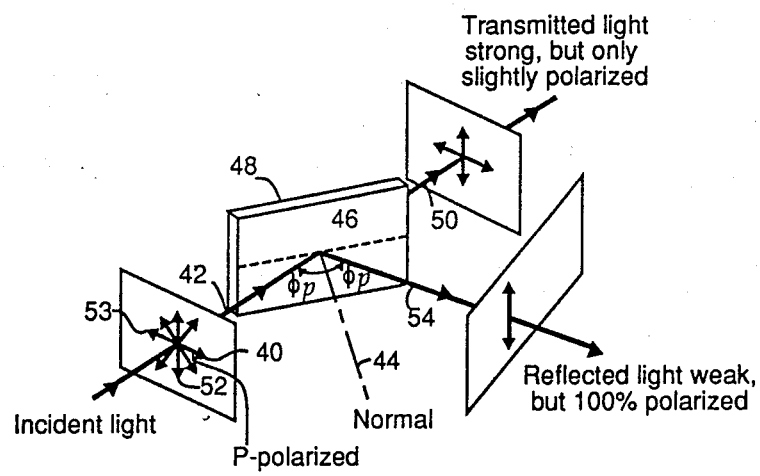
FIG. 3 illustrates the relationship between polarization and the reflected and refracted beams associated with a plate oriented at Brewster's angle in the path of a light beam.

This process can be better visualized by reference to FIG. 3, which shows in more detail the relationships between reflected light, refracted light, a Brewster plate, and the polarization vectors of incident light. In FIG. 3, the p-polarization is that polarization shown by the vector 40, which lies in the plane defined by the axis of incidence 42 and the normal 44 to the surface 46 of plate 48. The plate 48 is oriented such that the normal 44 makes Brewster's angle with the axis of incidence 42. The other polarization vectors 52 and 53 represent components of light which have had their polarizations altered away from p-polarization. Typically, this results for light at wavelengths other than the selected wavelength which have passed through the birefringent plate 18 and have experienced phase retardation when passing through said plate equal which is other than an integer number of wavelengths which also results in alteration of the polarization vector. Upon reflection from the mirrors defining the cavity, these rays become part of the incident light beam 42. When the angle between the normal 44 and the incident ray 42 is Brewster's angle, incident light polarized in the p-plane, as represented by polarization vector 40, is 100% transmitted through the plate 48 as the refracted light beam 50. Incident light having a polarization which is perpendicular to the plane containing the normal 44 and the incident beam 42 is partially reflected as represented by the vector 52. The incident light having the polarization represented by the vector 52 is partially reflected as the beam 54 and partially refracted to make up part of the beam 50. The percentage which is reflected versus the percentage which is refracted and transmitted through the plate 48 depends upon the index of refraction of the plate 48. Normally about 15% of the incident energy is reflected as the beam 54, with the remaining 85% transmitted through the plate 48 as the beam 50. Hence, the beam 50 is comprised of 100% of the incident light having the p-plane polarization and about 85% of the light having the polarization represented by the vector 52.

The incident light having polarization vectors such as the vector 52 and any of the other vectors shown in the figure other than the p-plane polarization 40 represents the light at non-selected frequencies which have passed through the birefringent filter plate 18 and which has encountered phase retardation during passage through the filter plate which is equal to other than an integer multiple of one wavelength. Part of this light which is polarized out of the p-polarization orientation is reflected upon each encounter with a Brewster surface. This would include encounters with the surfaces 26 and 34, as well as encounters with the two opposing surfaces of the dye jet 14, which are also oriented at Brewster's angle to the X axis. Thus, multiple reflections of these off-wavelength rays occur on each encounter with a Brewster surface as these rays are reflected back and forth between the mirrors 10 and 12 in the resonator cavity. Each of the reflections represents a loss. If the losses are sufficient, lasing at this wavelength will cease, since insufficient gain occurs on each passage through the dye jet 14. It is this loss mechanism which enables a dye jet laser to be tuned to a selected frequency.

Returning to the consideration of FIG. 2, it will be noted that the band of wavelengths for which the transmission factor is 1 or close to 1 is relatively large. It is desirable to have a very narrow range of frequencies over which the laser will lase. Accordingly, it is a common practice in the prior art to add additional birefringent plates in the path of the light beam inside the resonator cavity such that light passing through the first birefringent plate 18 must also pass through these subsequent birefringent plates. Because the subsequent birefringent plates are made with a thickness which is an integer multiple of the thickness T of the thinnest birefringent plate in the cavity, if the light passing through the first birefringent plate is of such a wavelength so as to experience a phase retardation which is an integer multiple of that wavelength, then upon passage through subsequent plates which are multiples of the thickness of the first plate, the light will experience phase retardation which is also an integer multiple of the wavelength in each subsequent plate. Therefore, this light will experience little or no loss in passing through subsequent plates. However, light having a wavelength outside the band of desired wavelengths will suffer losses in the subsequent plates in addition to the losses suffered in the first plate. For a typical installation wherein a second plate having four times the thickness of the first plate is present, the transmission factor versus wavelength function is as shown at curve 56 in FIG. 2. Note that the curve 56 has a peak at the wavelength $\lambda_0$ which is the same or very nearly the same as the peak for the transmission function 24 for the thinnest birefringent plate. Note also that multiple other peaks are present such as those shown at 58 and 60. These other peaks are referred to as sidebands and represent problems in high-gain lasers.

The presence of sidebands means that lasing can occur at wavelengths in the sideband peaks where no lasing is desired. This is especially true in high-gain lasers where the losses imposed upon light at the frequency of the sideband peaks may not be sufficient to prevent lasing at these wavelengths. The paper by Holtom and Teschke cited above, describes a structure to attenuate sideband peaks to eliminate the aforementioned problem. These workers in the art added additional glass plates to the stack of birefringent quartz plates such as the plate 18 in FIG. 1. The purpose of these additional glass plates placed in the cavity at Brewster's angle was to increase the polarizing efficiency. These same glass plate structures are used in accordance with the teachings of the invention for a different purpose and to achieve a different result, as will be described in more detail below.

The desirable aspect of introduction of subsequent birefringent plates into the resonator cavity is that the passband for lasing activity can be substantially narrowed. As can be seen from a study of the main peak at 62 of the function 56, a much narrower band of frequencies exists for the function 56 where the transmission factor is 1 or near 1. Thus, frequencies which have a transmission function which is near 1 for the transmission function 24 but which is not near 1 for the transmission function 56 will have losses imposed thereon by the second birefringent plate and possibly by other birefringent plates whose transmission functions are not shown in FIG. 2. The passband can thus be narrowed substantially through the use of these subsequent plates.

Figure 4:
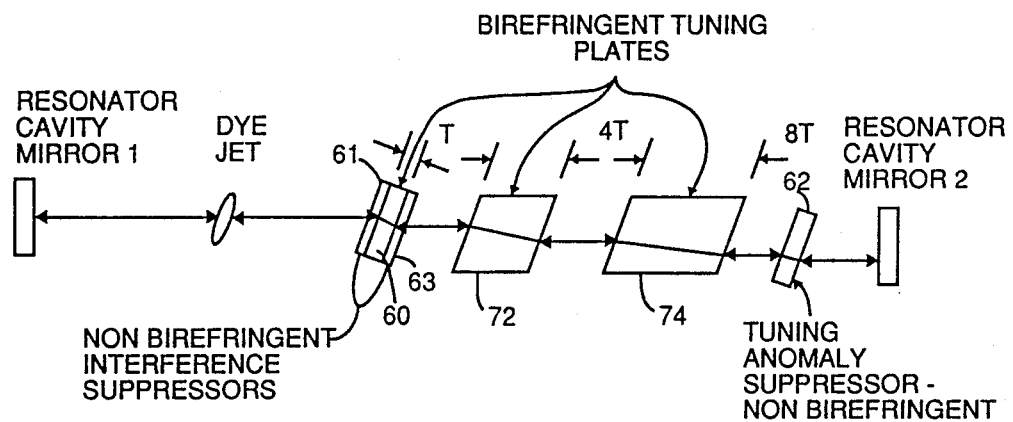
FIG. 4 illustrates the tuning structure according to the teachings of the invention including a multiple birefringent plate with a first plate of a specific thickness criteria and an additional Brewster plate.

Referring to FIG. 4, there is shown a diagram of the preferred embodiment of a laser according to the teachings of the invention. Appendix A, attached, is a detailed mathmatical derivation of the relationship between the various design criteria such as plate thickness, index of refraction and various angles in the system, including the tuning angle, and the wavelength at which the system will lase. Appendix A' is a re-expression of the derivation of the tuning equation (Equation 18 of Appendix A) using a clarified drawing and definitions of the angles and various quantities used in the equations of Appendix A. Appendix A' should be read before attempting to read Appendix A. Appendix A is also a detailed mathmatical derivation of several other important relationsips pertaining to the structure symbolized by the illustration of FIG. 4. In addition to deriving the tuning relationship (Equation 18), Appendix A also defines Free Spectral Range, and the relationship between the Free Spectral Range and the thickness of the first plate.

There is a problem in tuning when the Free Spectral Range is too small. This problem and its solution according to the teachings of the invention will be discussed in more detail below. The problem of interference effects and the solution to this problem according to the teaching of the invention is also discussed in Appendix A. Appendix A also discusses the problem of off order results or jumps in wavelengths which occur under some conditions and the solution to this problem according to the teachings of the invention. Appendix A also includes an Appendix A'" which is a discussion of the losses created by errors in the thicknesses of the second and third plates and errors in parallelism between the second and third plates and the thin plate. These problems will be discussed in more detail below. Appendix B, attached, is an explanation of how the tuning relationship derived in Appendix A can be derived from the general case given in the Lovold et al. paper.

The laser shown in FIG. 4 is comprised of the same elements as are found in the prior art, except that several key differences exist. The first of these differences is that the thickness of the first birefringent tuning plate 60 has been selected in accordance with the tuning equation shown in FIG. 5 to satisfy certain requirements. Those requirements will be described in more detail below. The equation of FIG. 5 represents a relationship which has been discovered by the applicant but which could be derived from the Lovold et al. reference if the substitutions suggested in Appendix B were made. This relationship is not found in any of the prior art work cited herein, and is not believed to be known in the prior art; however, the Lovold et al. reference cited previously can be used to derive Equation 18 of Appendix A by making the proper substitutions as shown in Appendix B. The tuning relationships given in some of the prior art cited herein seem to the applicant to be incorrect and not verifiable by experimental data. The tuning relationship shown in FIG. 5 has been verified from the violet to infra-red by experimental data.

Further, the structure shown in FIG. 4 differs from prior art lasers in the use of the tuning anomaly suppressor 62 in the form of a glass plate oriented at Brewster's angle to the beam resonating in the cavity. The purpose and function of this device 62 will be explained in more detail below.

Heretofore, the relationship between the wavelength which will be selected for lasing at any particular angle of the birefringent tuning plates, and all the other measurable factors on the right side of the equation of FIG. 5 has not been understood. The relationship expressed in the equation of FIG. 5 represents a major step forward in the sense that now the thickness of the first birefringent tuning plate 60 may be chosen as a matter of design criteria to achieve certain desirable characteristics of laser operation. In the past, the relationship of the selected wavelength to the thickness of the first birefringent plate was not mathematically known. This is because these two quantities were related by a complex relationship which included certain factors which were not measurable. As a result, prior art tuning equations were theoretically useful only and could not be used for purposes of designing a better dye laser. The equation of FIG. 5 represents the first known equation mathematically relating the thickness of the first birefringent tuning plate to the wavelength of lasing activity in terms of measurable factors.

Figure 6:
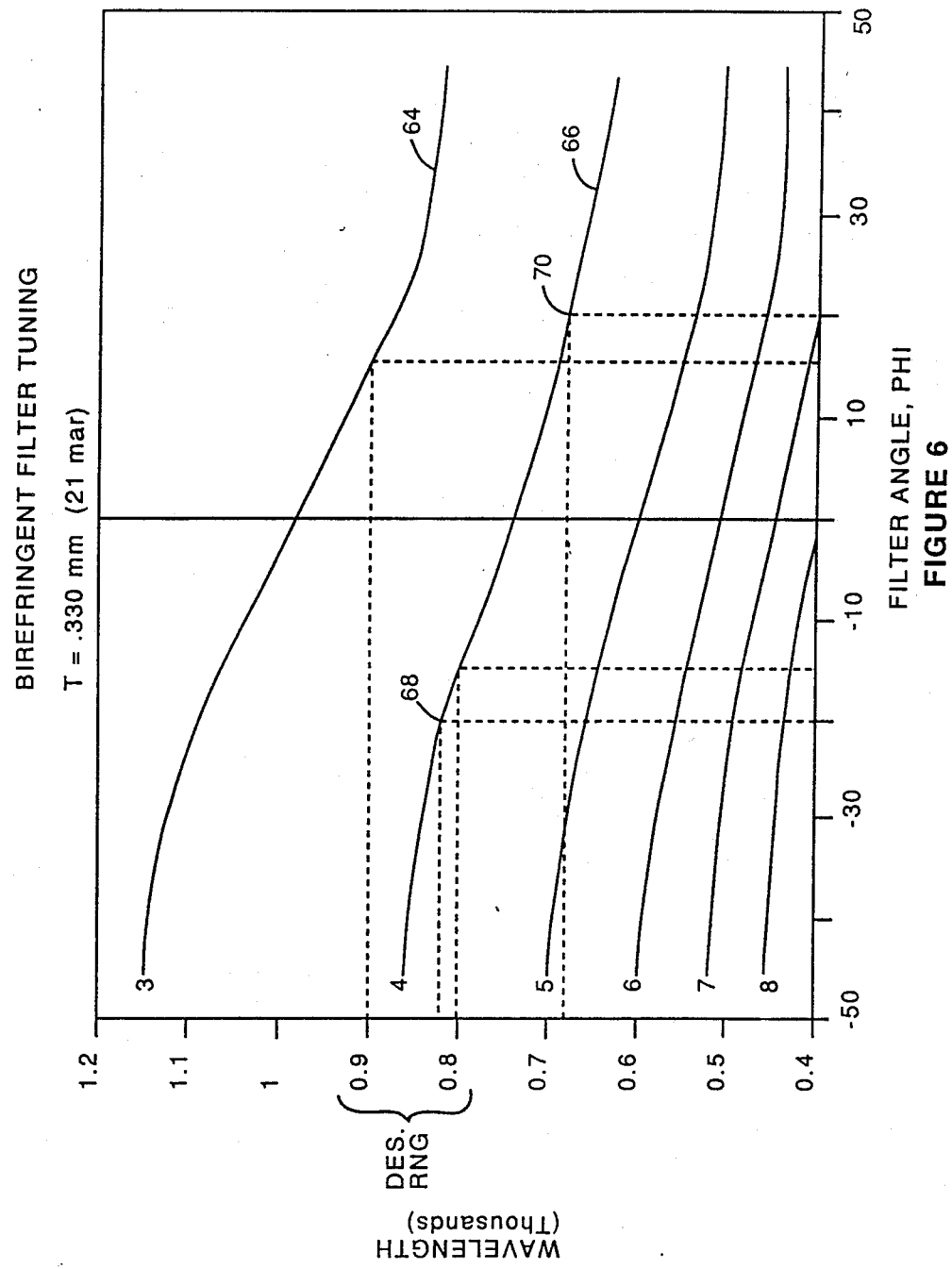
FIG. 6 illustrate a typical prior art family of tuning curves.

The utility of the tuning equation of FIG. 5 can be most easily appreciated by reference to FIG. 6, which shows a set of tuning curves for a birefringent tuning plate set with the first plate having a thickness of 0.33 mm. This is a very common thickness for prior art dye lasers. In FIG. 6, each curve represents the relationship between tuning angle and the frequency, i.e., wavelength, of zero loss for transmission through the birefringent tuning plate having a thickness of 0.33 mm. The numbers written to the left of each curve represent the order number in the sense of the number of full-wavelengths of phase retardation during travel through the birefringent plate. For example, the curve 64 represents the third order tuning curve wherein the phase retardation between the ordinary ray and the extraordinary ray amounts to three full wavelengths. Likewise, the curve 66 is the fourth order curve wherein the phase retardation is equal to four full wavelengths.

One tuning range of interest in a dye laser is between 0.8 microns and 0.9 microns in wavelength. Wavelengths within this range are selected by altering the filter angle, phi. This causes the wavelengths of zero loss to be altered such that the wavelength of lasing activity is changed. For example, if the filter angle is varied between −15 degrees and +15 degrees, the wavelength of lasing will be altered along the fourth order tuning curve between the points 68 and 70.

As can be seen from inspection of FIG. 6, even if the tuning angle were changed to −50 degrees, the wavelength of minimum loss would never reach 0.9 microns. To cause the laser to lase at 0.9 microns, it would be necessary to switch tuning curves to the third order curve. This would mean that the filter angle would have to be varied from approximately −14 degrees to select 0.8 microns on the fourth order tuning curve to approximately +8 degrees on the third order tuning curve to select wavelengths of approximately 0.9 microns. The difficulty with this approach is that it requires high tuning angles on the fourth order curve to select wavelengths in the bottom half of the range from 0.8 to 0.9 microns, and then it requires a large change in angle to 17 to 18 positive degrees to switch to the third order tuning curve to select wavelengths in the upper half of the desired tuning range. This is both inconvenient and causes certain errors.

It has been noted by workers in the art that certain errors are caused or aggravated at high tuning angles. Thus, when the tuning angle is between 30 and 50 degrees on the fourth order tuning curve, these errors begin to occur. Such errors include lasing at sideband frequencies or jumping to a lower order solution. As to this latter phenomenon, it has been noted by workers in the prior art that when hard pumped dye lasers having tuning curves similar to that shown in FIG. 6 are tuned to near the ends of the tuning range on any particular order curve, there frequently occurs a jump in the lasing frequency to a frequency closer to the center of the desired tuning range. The reason that this jump occurs is that there is more system gain near the band center even with polarization losses, than exists near the dye range edges even with p-polarization. However, this jump is known to be undesirable since users of such lasers in the field prefer substantially linear and smooth tuning throughout the tuning range with no sudden jumps in the color of the output light. Therefore, it would be preferable to have a structure wherein the lasing action ceases prior to such a jump occurring.

To eliminate all of these problems, the structure for a dye laser shown in FIG. 4 has been found according to the teachings of the invention to result in a substantially improved dye laser. The thickness of the element 60 is designed in accordance with the tuning equation given in FIG. 5 to provide several beneficial effects. The polarizing element 62 is provided to eliminate jumping to lower order solutions, i.e., changing in color, of the laser output light when the laser is tuned to wavelengths near the ends of the tuning range. The polarizer 62 serves this purpose by causing additional losses to result when the jump occurs. These losses may be sufficient to extinguish the laser. If not, additional polarizers can be used. The applicant has discovered that when such a jump occurs, not only does the wavelength change, but the polarization angle changes as well. Polarizer 62 is oriented such that only light having the polarization angle at the wavelength selected by the birefringent tuning plates can pass through the polarizer 62 without substantial losses. Light having any other polarization angle will suffer considerable losses during transmission through the polarizer 62. Because the polarization angle jumps substantially to a different value when the undesired jump near the end of the tuning curve occurs, the polarizer 62 imposes sufficient additional losses on the light having the changed wavelength and polarization angle such that lasing action at this wavelength is extinguished.

This effect occurs independently and separately from the effect caused by proper selection of the thickness of the birefringent tuning element 60. Therefore, the polarizer element 62 can be used in a prior art laser to provide a separate and independent improvement in the operation of such a laser. That is, its effect will occur regardless of the thickness of the birefringent tuning element 60.

Figure 7:
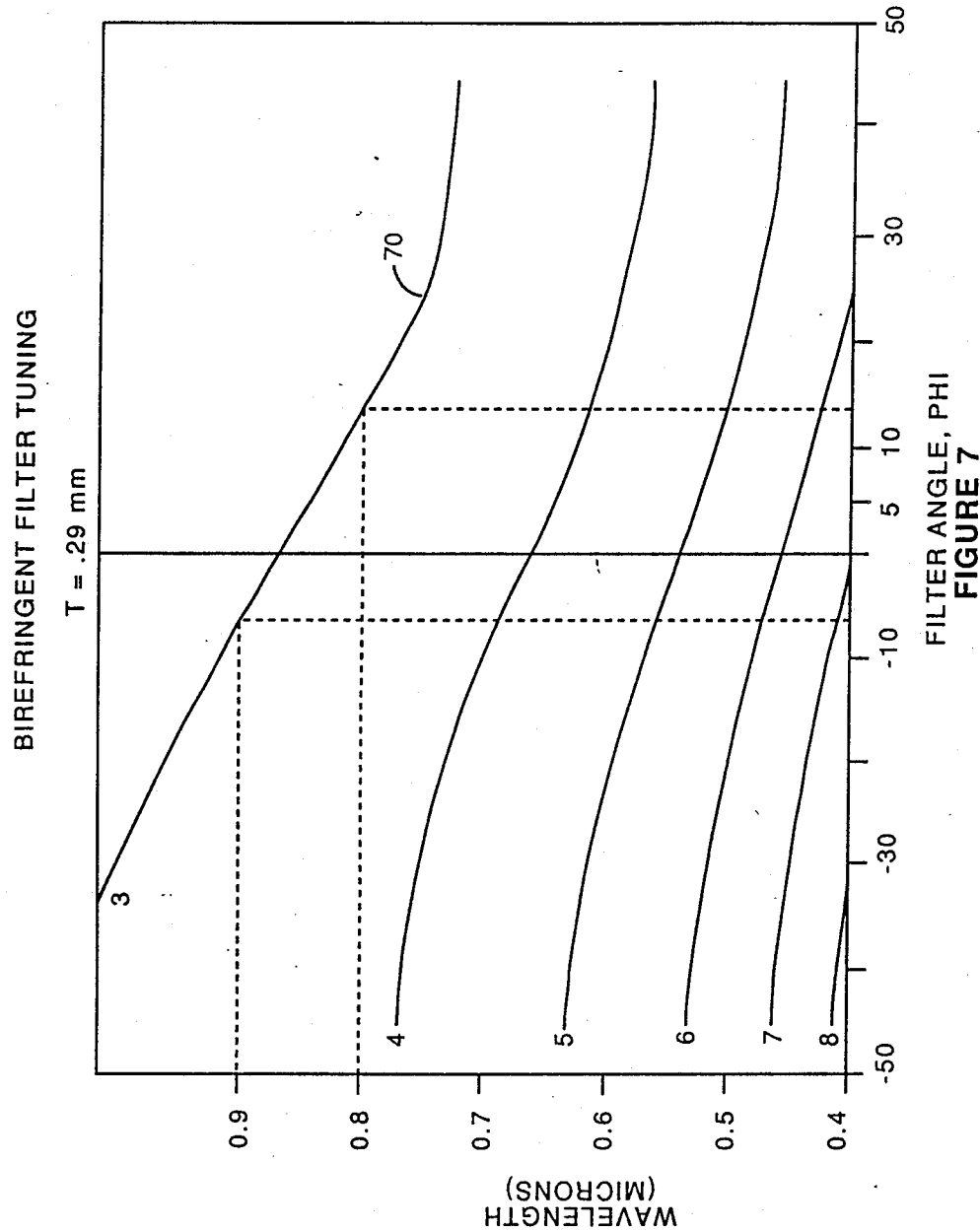
FIG. 7 illustrates the family of tuning curves which result when a birefringent filter tuning mechanism having a first plate of the preferred thickness predicted by the equation of FIG. 5 for a desired range of wavelengths in the passband, and meeting the Free Spectral Range requirement in the wavelength range 420 nm to 480 nm.

The thickness of the birefringent tuning element 60 is selected in accordance with the tuning element given in FIG. 5 such that the tuning curves shown in FIG. 7 results. Again, this effect occurs independently of the presence of the polarizing element 62. Therefore, an improved laser will result using the thickness for the birefringent tuning element 60 given in FIG. 7 even if the polarizing element 62 is not present. The presence of the polarizing element 62 adds the additional benefit of suppressing the tuning anomalies which can occur near the end of the tuning range. Such tuning anomalies are also referred to as off order solutions and are graphically shown as the wavelengths of lasing shown at points 80, 82 and 84 in FIG. E of Appendix A.

In FIG. 7, the tuning curves for a first birefringent plate thickness of 0.29 mm are shown. Note that the third order tuning curve 70 covers the entire desired tuning range from 0.8 to 0.9 microns in a relatively linear fashion such that equal displacements of filter tuning angle result in approximately equal displacements of the selected wavelength of lasing. Note also that the tuning range is centered on a filter angle of approximately 5 degrees.

The thickness of the first plate was chosen such that a single order curve would cover the desired tuning range and be centered on approximately 5 degrees for the following reason. During the manufacture of the birefringent tuning plates, thickness can be easily controlled to within only plus or minus 5 microns with current production technology. This divergence of the thickness of birefringent tuning plates two and three away from exact integer thickness multiples of the thickness of the thinnest birefringent tuning plate causes losses. Thickness error in the first and thinnest tuning plate only changes the center frequency of the tuning range. Acceptable limits for losses caused by thickness errors in the thicknesses of the second and third tuning plates are losses in a single pass of 0.5% or less. An acceptable range of single pass losses caused by thickness errors would be from 1% to 0.1% depending upon the application. Thickness tolerances of plus or minus 5 microns will hold losses within an acceptable range. Tighter tolerance can be achieved, but is more expensive to attain.

Lack of parallelism between the tuning plates also causes losses. Mounting the plates to be parallel is important to hold down losses. Acceptable tolerances for parallelism are approximately 6 minutes for the third plate and 24 minutes for the second plate. It is desired to hold the losses caused by lack of parallelism to the same range as losses caused by thickness errors. If the above cited parallelism tolerances are maintained, the losses created by the lack of exact parallelism will be no greater than one half the losses created by the thickness errors if these thickness errors are within the tolerance mentioned above for thickness errors.

Also, it is desirable to have approximately linear tuning with not excessive sensitivity and easy alignment. Sensitivity to thickness errors is less in linear regions of the tuning curves. Before the concept of linear tuning can be understood, the meaning of the terms sensitivity and alignment should be understood.

Sensitivity means that the tuning curve should have a slope which results in a relatively gradual change of the selected wavelength for a relatively gradual change of the filter angle. In other words, if very small changes in the filter angle result in very large changes in the wavelength, then the tuning will be too sensitive to achieve very fine resolution of the wavelength of lasing. The structure suggested by the Lovold et al. reference with the optic axis out of the plane of the birefringent tuning plate has the characteristic that the wavelength of lasing is ten times as sensitive to changes in the tuning angle, phi, where the optic axis is at 45 degrees as when the optic axis is in the plane of the tuning plate. The slope of the tuning curve is not very dependent on thickness.

Figure 8:
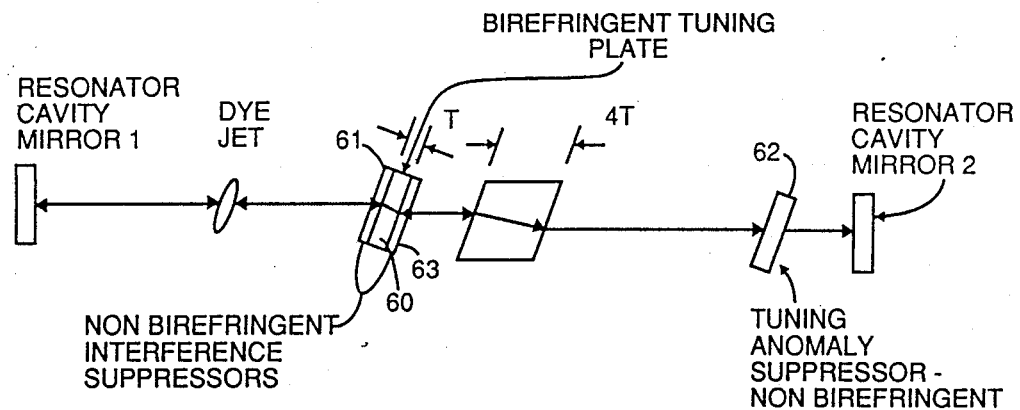
Figure 9:
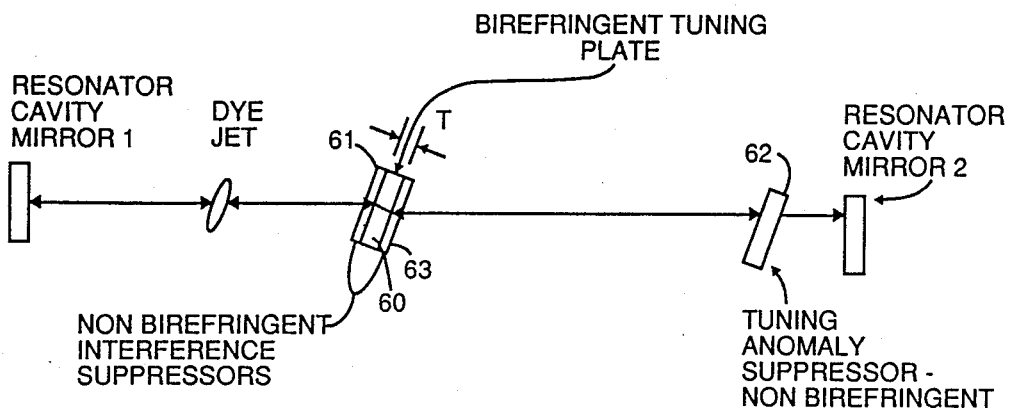
Figure 10:
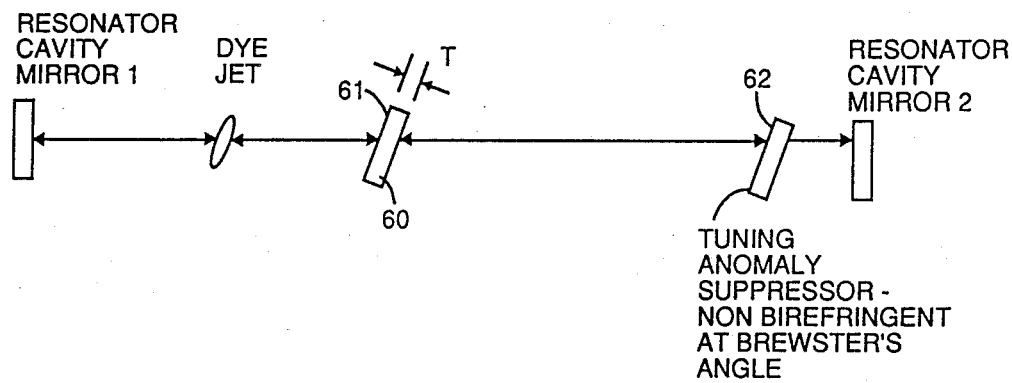
Figure 11:
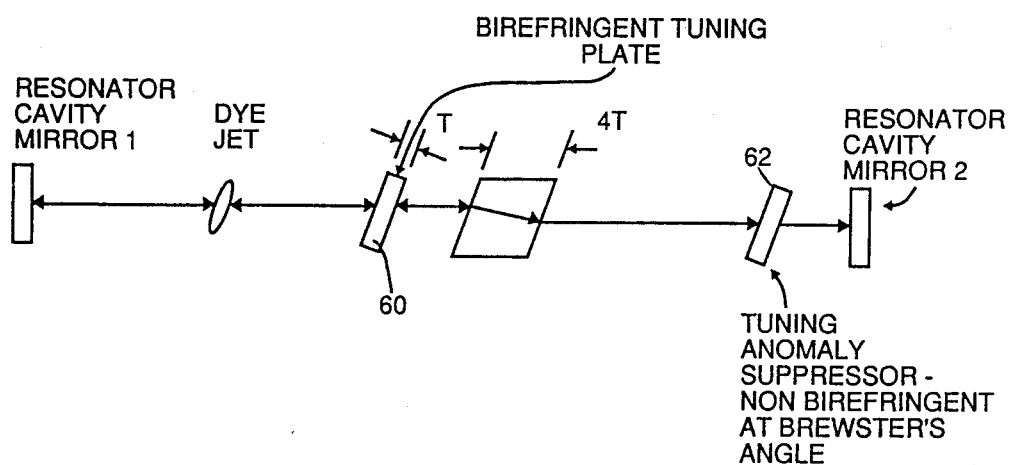

Other considerations regarding sensitivity are the smoothness or discontinuity of the tuning. Tuning discontinuities can result because of interference effects described in Appendix A. These interference effects are readily apparent in 1-plate filters in the thickness range from 0.26 to 0.38 mm, with the effect becoming more pronounced as the thickness of the plate decreases. The effects are also apparent in 2-plate filters, but are not normally present in 3-plate filters. These interference effects cause discontinuities in the tuning of the laser where the wavelength of lasing can jump by as much as 1 nm. This effect can be suppressed by optically contacting the thin birefringent plate to a glass substrate of the same index of refraction. FIG. 4 includes such a glass substrate in optical contact with the thinnest birefringent plate 60 in the form of two layers 61 and 63 of index matched non birefringent glass formed on the surfaces of the plate 60. The layers 61 and 63 of glass are preferably KZFn1 glass of a thickness from 0.5 to 2.0 mm with 1.4 mm being typical. The layers 61 and 63 are optional for the three plate embodiment shown in FIG. 4. 1-plate and 2-plate dye lasers having non birefringent plates in optical contact with the thinnest plate are shown in FIGS. 8 and 9. FIGS. 10 and 11 show 1-plate and 2-plate dye lasers having non birefringent plates in the cavity at Brewster's angle to suppress tuning anomalies where the interference fringe suppressors in the form of non birefringent plates in optical contact with the thinnest tuning plate 60 are omitted. All the structure and funtion of the various elements in FIGS. 8, 9, 10 and 11 are the same as previously explained for the embodiment shown in FIG. 4 except that the extra birefringent tuning plates are not present, so the peak transmission factor of the transmission factor versus wavelength curve (see FIG. 2) will occur over a broader range of wavelengths. Note that the non birefringent layers of index matched glass for interference fringe suppression in FIGS. 8 and 9 may be placed on only one surface of the thinnest birefringent plate in all the embodiments of FIGS. 4, 8 and 9.

Another important design criteria controlling the structure picked from the infinite number of combinations of structural elements from which a dye laser may be constructed is the Free Spectral Range. The Free Spectral Range means the wavelength difference between the tuning curves of different orders. It is important that the Free Spectral Range be large enough that there be no overlap between different order curves in the range of tuning angles, Ph, encompassed by the intersection between the selected order tuning curve upon which operation is desired and the gain profile for the dye being used in the laser. This can be understood by reference to FIGS. F and G of Appendix A. Gain profiles 90, 92, 94 and 96 represent the bands of wavelengths wherein lasing activity can occur in the four dyes identified by the information written insides these bands. The dashed lines 98 and 100 in FIG. F represent the extent of the effective tuning angles that will change the lasing wavelength on tuning curve 102, the fourth order solution, for the dye PYR/LD700 having gain profile 90. In other words, with this dye and operating on the fourth order tuning curve 102, the wavelength of lasing can be altered between the wavelength at the line 104 for the tuning angle at line 100 and the wavelength at line 106 at the tuning angle 98. Note that the fifth order solution tuning curve 108 does not intersect the gain profile 90 anywhere inside the range of tuning angles between the lines 98 and 100. If the Free Spectral Range were smaller, the fifth order solution tuning curve 108 would be closer to the fourth order solution tuning curve 102. If the Free Spectral Range is small enough that this "overlap" occurs, lasing activity could jump from lasing at one wavelength corresponding to the current tuning angle on one tuning curve to the wavelength corresponding to the same tuning angle on the other tuning curve. This jump will occur if the other tuning curve has higher gain and results in a discontinuity in the wavelength of lasing. By properly selecting the thickness of the first plate 60 to be thinner than is used in the prior art it is possible to remove any overlap by increasing the Free Spectral Range (FSR).

The ease of alignment factor mentioned above is an additional beneficial effect of the chosen thickness for the first plate. Alignment in a multiple tuning plate dye laser is needed because of the changes in lasing wavelength which occur because of the losses caused by the introduction to the laser cavity of additional tuning plates which are not perfect integer multiples of the thickness of the first plate and which are not perfectly parallel to the first plate. These losses shift the wavelength of lasing. The process of alignment is the process of rotating the second plate relative to the first plate until the wavelength of lasing is the same as it was before introduction of the second plate when the laser was operating with only one tuning plate. This raises the question as to what wavelength to choose as the "original" wavelength to align against. In other words at what angle does one set the tuning angle of the first tuning plate to establish the wavelength which will serve as the reference wavelength during the alignment process. In the prior art, this wavelength was chosen to be whatever wavelength resulted when the tuning angle was set at zero, i.e., the middle of the tuning range. It has been discovered by the applicant that this is not the best tuning angle to use to establish the reference wavelength. The best angle to use for the tuning angle is either $-8$ degrees or $+18$ degrees. The second and third plates are then individually rotated until the wavelength of lasing is again the wavelength that resulted with only the thinnest tuning plate present with the tuning angle set at either minus 8 or $+18$ degrees. In Figures K and L of Appendix A, it can be seen that the second and third tuning plates are rotated until the tuning error is zero at $-8$ and $+18$ degrees. In the prior art, the alignment was done at a wavelength near the peak of the dye curve which led to larger errors at the wings of the tuning curves. By choosing the tuning angle for the first plate at $-8$ or $+18$ degrees to establish the reference wavelength, it is possible to maximize the tuning range with low losses to be larger than could be achieved using prior art alignment methods. For example, referring to the error curve of FIG. L in Appendix A, curve 100 represents the error curve that results when the method of aligning according to the teachings of the invention is used. The error curve 100 represents the wavelength error that results because of the additional losses imposed upon the system resulting from the presence of the second and third tuning plates. The wavelength error refers to the actual wavelength of lasing as opposed to the wavelength of lasing that would result if the second and third tuning plates were not present. Note that the wavelength error is moderately negative at tuning angles between $-8$ and $+18$ degrees, 0 at $-8$ and $+18$ degrees and is moderately positive for tuning angles outside the range from −8 to 18 degrees. In contrast, note the filter tuning error curve 102 that results when the alignment method of the prior art is used. In this method, the tuning angle to establish the reference wavelength is set at or near the dye curve peak which is usually between 0 and +5 degrees. This results in small wavelength errors for tuning angles at or near the range between 0 and +5 degrees but for increasingly positive wavelength errors for tuning angles outside this range. Note that at the wings or extremities of the tuning error curve 102, the magnitude of the tuning error is larger than the corresponding tuning error on the curve 100. The relationship between the wavelength error and the loss of intensity upon transmission of light through the structure is given in Equation (45) of the Appendix A'''.

In the structure shown in FIG. 4, the second birefringent tuning plate 72 usually has a thickness of 4 times that of the thickness T of the first plate 60. Likewise, the third birefringent tuning plate often has a thickness of approximately 16 T. If plates of such thickness could be exactly manufactured out of quartz or other birefringent material with no error, there would be no alignment difficulty. That is, it would be possible to align the second plate 72 such that zero losses at all tuning angles would be imposed upon light refracted through the first plate having p-polarization when the optic axis of the second plate 72 is parallel to the optic axis of the first plate 60. Likewise, if the plate 74 were exactly 16 T in thickness, it too would impose zero or minimum loss on light refracted through the second plate 72 if the optic axis of the plate 74 was aligned to be parallel to the optic axis of the plate 72. However, when the plates 72 and 74 are manufactured such that small errors in their thicknesses occur, then the phase retardation of light emerging from the first plate 60 and passing through the second plate 72 is not exactly an integer multiple of one wavelength. Therefore, losses will occur at the surfaces of the plate 72. Likewise, if the plate 74 is not exactly 16 T in thickness, then the phase retardation of light passing through the plate 74 will not be an exact integer multiple of one wavelength. Therefore, losses will occur at the surfaces of the plate 74.

It has been found theoretically and by computer modelling that these manufacturing tolerance losses can be minimized if the tuning angle at the center of the tuning range is centered at approximately 5 degrees.

All these beneficial effects are made possible by knowing the proper tuning relationship specified in the equation given in FIG. 5. Knowing this relationship allows the proper thickness for the first plate to be chosen out of the infinite number of possible thicknesses to achieve the beneficial effects described above. Without knowing the equation given in FIG. 5, a vast amount of experimentation with many different thicknesses would have to be performed to find the correct thickness to achieve the results intrinsically specified in the tuning curves shown in FIG. 7. In addition, the tuning relationship allows calculation of tolerances in key parameters: plate thickness, plate parallelism, and plate alignment.

Although the invention has been described in terms of the preferred embodiment disclosed herein, those skilled in the art will appreciate alternative embodiments which may be employed to achieve the beneficial effects of the invention without departing from the spirit and scope of the teachings thereof. All such modifications and alternative embodiments are intended to be included within the scope of the claims appended hereto.

APPENDIX A'

MATHEMATICAL DERIVATION OF TUNING EQUATION

START WITH KNOWN RELATIONSHIP OF PRIOR ART $$(1) \quad \delta = \frac{2\pi (N_e - N_o) T \sin^2 \gamma}{\lambda \sin \theta}$$

WHERE $\delta$ = PHASE RETARDATION AS LIGHT PASSES THROUGH BIREFRINGENT PLATE $N_e$ = INDEX OF REFRACTION FOR EXTRAORDINARY RAY $N_o$ = INDEX OF REFRACTION FOR ORDINARY RAY $T$ = THICKNESS OF BIREFRINGENT PLATE $\gamma$ = ANGLE BETWEEN OPTIC AXIS AND REFRACTED RAY (UNMEASURABLE)

$\lambda$ = WAVELENGTH OF INCIDENT LIGHT $\theta$ = ANGLE OF INCIDENCE OF INCIDENT LIGHT THE DIAGRAM ON THE NEXT PAGE ILLUSTRATES THE ABOVE FACTORS AND OTHER RELATIONSHIPS NEEDED FOR THIS DERIVATION

APP. A'

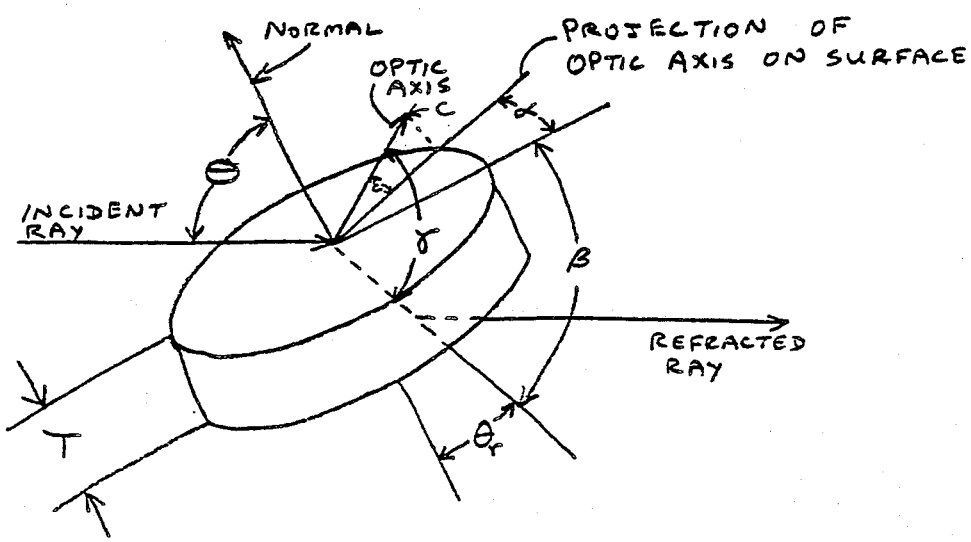

WHEN C LIES IN THE PLANE OF THE PLATE AND $\epsilon$ IS THEREFORE ZERO THE FOLLOWING RELATIONSHIPS ARE TRUE (2) $\sin^2 \gamma = 1 - \cos^2 \gamma = 1 - (\cos^2 \alpha \cos^2 \beta)$ (3) $\quad \sin\theta_r = \dfrac{\sin\theta}{N} \quad$ BY SNELL'S LAW RELATING SNELL'S LAW TO $\beta$ (4) $\quad \beta = \dfrac{\pi}{2} - \theta_r$

SO, (5) $\quad \cos\beta = \cos\dfrac{\pi}{2}\cos\theta_r + \sin\dfrac{\pi}{2}\sin\theta_r$ $\qquad\qquad = \sin\theta_r = \dfrac{\sin\theta}{N}$

THEREFORE, (6) $\quad \sin^2\gamma = 1 - \cos^2\alpha \dfrac{\sin^2\theta}{N^2}$

SO, (7) $\quad \delta = \dfrac{2\pi\Delta N\, T}{\lambda \sin\theta}\left(1 - \cos^2\alpha \dfrac{\sin^2\theta}{N^2}\right)$ WHERE $\Delta N = N_e - N_o =$ BIREFRINGENCE

SOMETIMES IT IS CONVENIENT TO DEFINE (8) $\quad \phi = \alpha + \dfrac{\pi}{4} \quad$ SO $\phi = 0$ WHEN $\alpha = -\dfrac{\pi}{4}$

THEN, (9) $\quad \cos^2\alpha = \cos^2\left(\phi - \dfrac{\pi}{4}\right)$

(10) $\qquad\quad = \left(\cos\phi\cos\dfrac{\pi}{4} + \sin\phi\sin\dfrac{\pi}{4}\right)^2$

(11) $\qquad\quad = \left[\dfrac{\sqrt{2}}{2}(\cos\phi - \sin\phi)\right]^2$

(12) $\qquad\quad = \dfrac{1}{2}(\cos^2\phi + \sin^2\phi + 2\cos\phi\sin\phi)$

(13) $\quad \cos^2\alpha = \dfrac{1}{2}(1 + \sin 2\phi)$

TO GET THE WAVELENGTH DEPENDENCE, IMPOSE THE CONDITION THAT

(14) $\quad \delta = 2\pi m \quad$ WHERE $m =$ ANY INTEGER $$(15) \quad \lambda = \frac{\Delta N T}{m \sin \theta} \left( 1 - \frac{\sin^2 \theta}{N^2} \cos^2 \alpha \right)$$

OR, $$(16) \quad \lambda = \frac{\Delta N T}{m \sin \theta} \left[ 1 - \frac{\sin^2 \theta}{2 N^2} \left( 1 + \sin 2\phi \right) \right]$$

APPENDIX B

DERIVATION OF EQ. (7) OF APPENDIX A FROM THE LOVOLD, ET AL. REFERENCE EQ. (6), p. 203

$$\cos \gamma = \cos \beta \cos \sigma + \sin \beta \sin \sigma \cos \rho$$

WHERE $\beta = \theta_r$ IN APP. A $\sigma = 90 - \varepsilon$ IN APP. A $\rho = \alpha$ IN APP. A

SO, $$\cos \gamma = \cos \theta_r \sin \varepsilon + \sin \theta_r \cos \varepsilon \cos \alpha$$

WHEN $\varepsilon = 0$ $$\cos \gamma = \sin \theta_r \cos \alpha$$

AND, $$\sin \theta_r = \frac{\sin \theta}{N}$$

SO, $$\cos^2 \gamma = \frac{\sin^2 \theta}{N^2} \cos^2 \alpha \quad \text{AS IN APP. A}$$

BIREFRINGENT FILTER DESIGN IMPROVEMENT

Ben Woodward
June 9, 1987
rev 8/28/87
rev 9/3/87
rev 3/22/88
rev 4/21/88

Introduction

The concept of using one or more birefringent plates to tune a dye laser has been used for over a decade (1,2). Several papers (1,2,3,4,5) have gone into various details of theory, construction, alignment, and application; however, to my knowledge, the only direct experimentally verified tuning curve was reported in Lovold, et al. (6) for a wavelength range quite different from that used in dye lasers, and no adequate explanations have been given for the discontinuous tuning often observed.

My purpose was to explore ways of improving birefringent filter performance: specifically, to avoid order jumps during tuning over a single dye, make tuning reliably smoother, and if possible, to design filters for a wider range of useful operation than a single dye. It was not my intention to be more rigorous than necessary to meet those objectives. The results so far have been very satisfactory, and this work should make these filters far easier to design, fabricate, and use than heretofore.

Basic Formula

The phase retardation of a wave passing through a birefringent plate is given by $$\delta = \frac{2\pi (n_e - n_o) T \sin^2 \gamma}{\lambda \sin \theta} \quad (1)$$

(Born and Wolf, p.699), where $\gamma$ is the angle between the c axis and the light ray in the plate, and $\theta$ is the angle of incidence.

Geometry:

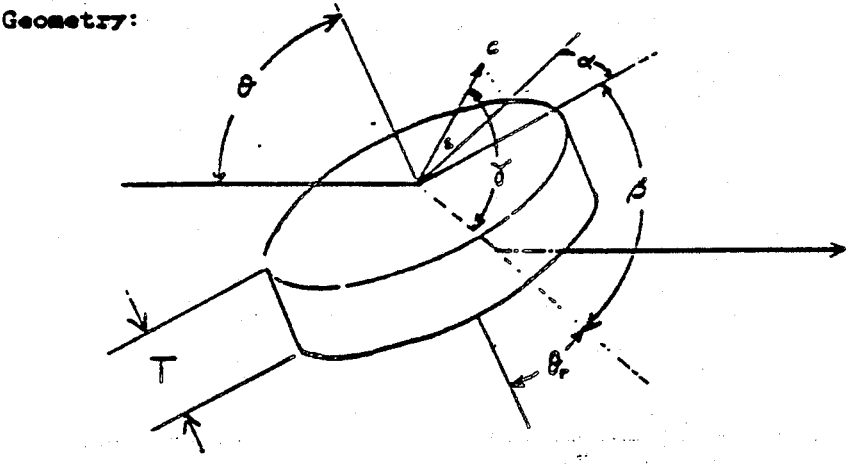

Now for introductory purposes, consider angle $\epsilon = 0$: then, $$\sin^2 \gamma = 1 - \cos^2 \gamma = 1 - \cos^2 \alpha \cos^2 \beta \quad (2)$$

Snell's Law gives $\quad \sin \theta_r = \frac{\sin \theta}{n} \quad (3)$ and $\quad \beta = \pi/2 - \theta_r \quad (4)$ so $\quad \cos \beta = \sin \theta_r = \frac{\sin \theta}{n} \quad (5)$ and therefore, $\quad \sin^2 \gamma = 1 - \cos^2 \alpha \frac{\sin^2 \theta}{n^2} \quad (6)$ so, $\quad \delta = \frac{2\pi \Delta n T}{\lambda \sin \theta} \left(1 - \cos^2 \alpha \frac{\sin^2 \theta}{n^2}\right) \quad (7)$ where $\Delta n \equiv n_e - n_o$. $\quad (8)$ Sometimes it is convenient to define $\phi = \alpha + \frac{\pi}{4}$, so that $\phi = 0 \quad (10)$ when $\alpha = -\pi/4$.

Then,
$$\cos^2\alpha = \cos^2(\phi - \pi/4) \tag{10}$$
$$= (\cos\phi \cos\pi/4 + \sin\phi \sin\pi/4)^2 \tag{11}$$
$$= \left[\frac{\sqrt{2}}{2}(\cos\phi + \sin\phi)\right]^2 \tag{12}$$
$$= \frac{1}{2}(\cos^2\phi + \sin^2\phi + 2\cos\phi\sin\phi) \tag{13}$$
$$\cos^2\alpha = \frac{1}{2}(1 + \sin 2\phi) \tag{14}$$

This expression is usually used in my notes and in the graphs.

Finally, to get the wavelength dependence, we impose the condition that
$$\delta = 2\pi m \quad (m \text{ integer}) \tag{15}$$

so
$$\lambda = \frac{\Delta n T}{m \sin\theta}\left(1 - \frac{\sin^2\theta}{n^2}\cos^2\alpha\right) \tag{16}$$

or
$$\lambda = \frac{\Delta n T}{m \sin\theta}\left[1 - \frac{\sin^2\theta}{2n^2}(1 + \sin 2\phi)\right] \tag{17}$$

This equation has been verified experimentally in several places. The graphical solutions for two different plate thicknesses are shown in Figures C and D. Experimental results are shown in Figures E, H, and I.

Single Order Tuning

Previously certain dyes required more than one order for complete tuning, requiring a large angle reset to continue tuning; moreover, spectral sensitivity of the filters degrades near the ends of the tuning ranges (where $\phi = +-45$). See Figure 3. Using the above equations, I tested various thicknesses to see if a single thickness could be used for all dyes. Although that proved negative, two different thicknesses can be found such that all dyes are reasonably centered in one or the other filter. Figures 4 and 5 show the calculated wavelength vs angle for .33 mm and .29 mm plates respectively in relation to the wavelength ranges of the red dyes where the order jumps have been observed. The .29 mm filter tested in DCM and Styryl 9 could be tuned over the entire ranges on a single order, as predicted; the slight offset in the data shown in Figure 6 is attributed to an error in setting the tuning angle = 0.

Free Spectral Range of Filter

By analogy to etalon nomenclature, we define the Free Spectral Range (FSR) of the filter as the separation between transmitted orders; i.e., the vertical separation between curves. When the dye tuning range is longer than the filter FSR, the operating wavelength will jump to the order having more gain, giving incomplete tuning. This effect is commonly observed in Stilbene 3 which has a large tuning range compared with the center wavelength.

What is the expected FSR? Since
$$\lambda = \frac{\Delta n T}{m} f(\theta,\phi) \tag{18}$$

then
$$m\lambda_1 = (m-1)\lambda_2 = \Delta n T f(\theta,\phi) \tag{19}$$

so
$$FSR \equiv \lambda_2 - \lambda_1 = \frac{\lambda_2}{m} \quad \left(\propto \frac{T}{m^2}\right) \tag{20}$$

It's not surprising, then, that the problem occurs in Stilbene 3, where $\lambda_2 = 480$ nm and $m = 6$ or 7. By using the thinner plate and $m = 6$, the FSR was increased 14% and should be long enough to allow tuning to the 20% points. In the test performed, the dye was shifted to the violet by about 10 nm, so the long wavelength break occurred short of 480 nm and at about 1/2 power. See Figure I.

Interference Effects

These birefringent filters exhibit interference effects which look like etalons of almost the thin plate thickness, but not quite. These effects are readily apparent in 1-plate filters in the thickness range from .26 to .38 mm, with the effect more pronounced in the thinner plates. Effects are also apparent in 2-plate filters under certain conditions, but are not normally present in 3-plate filters. These effects have been called "fluctuations," in which spectral amplitude and linewidth change significantly over just a fraction of the dye tuning range. As one tunes the filter, the interferometer patterns vary as shown below:

Figure A

In some cases, we observe discontinuous tuning, in which the wavelength jumps as much as 1 nm.

Jim Kafka pointed out that the observed data (including the data plotted in Figure 8) could be explained by the interference of the two weakly reflected beams from the sides of the thin filter plate. As these beams interfere, alternately constructively and destructively, that impacts the beam oscillating in the dye laser cavity. The beam separation, s, is determined as follows:

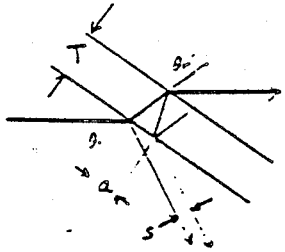

$$a = 2T \tan \theta_r \quad (22)$$

$$\therefore a = \frac{2T \sin \theta_i}{n \cos \theta_r} \quad (23)$$

Figure B at Brewster's angle, $\cos \theta_r = \sin \theta_i$ \quad (24)

so \quad $a = 2T/n$ \quad (25)

Now, $s = a \cos \theta_i$, so $s = \frac{2T}{n} \cos \theta_i$ \quad ($s = .70\,T$) \quad (26)

(If $T = .3$ mm, $s = .21$ mm, much smaller than the beam size.)

It can be shown that the optical path difference between the two reflected beams is $2nT \sin \theta_i$.

This idea was verified experimentally by measuring the wavelength separation of narrow fringes as a function of plate thickness. The figure below shows the fringe spacing in GHz vs the reciprocal of plate thickness times $\sin \theta_i$. The straight line is drawn at the theoretical slope value, $c/2n = 97$ GHz/mm-1.

This effect can be partially suppressed by optically contacting the thin birefringent plate to a glass substrate of the same index of refraction. Since the reflected power near Brewster's angle (p-polarization) is less than .001%, we desire an index match such that the reflection at the interface is much less even than that.

To find an approximate relation between reflectivity and n, we recall that $$r_p = \left[ \frac{\tan(\phi - \phi')}{\tan(\phi + \phi')} \right]^2 \quad (27)$$

and $$\frac{\sin \phi'}{\sin \phi} = \frac{n}{n'} \quad (28)$$

With $\phi + \phi' \doteq 2\phi$ and $\phi' = \phi + \Delta\phi \quad (29)$ then $\sin \phi' = \sin\phi + \Delta\phi \cos\phi \quad (30)$ and $\frac{\sin \phi'}{\sin \phi} = 1 + \Delta\phi \cot\phi \quad (31)$ In this case, $\cot\phi = n \quad (32)$ so $\frac{\sin\phi'}{\sin\phi} = 1 + n\Delta\phi \quad (33)$ and $\frac{n}{n'} = \frac{n}{n - \Delta n} \doteq 1 + \frac{\Delta n}{n} \quad (34)$ $$\therefore \frac{\Delta n}{n} \doteq n\Delta\phi \quad \text{or} \quad \Delta\phi = \frac{\Delta n}{n^2} \quad (35)$$

$$r_p \doteq \frac{\tan(-\Delta\phi)}{\tan 2\phi} \doteq \frac{-\Delta n}{n^2 \tan 2\phi} \quad (36)$$

For crystal quartz, n = 1.55, so $$r_p \doteq \frac{(\Delta n)^2}{23} \quad (37)$$

To get $r_p < 10^{-6}$, then $\Delta n < 5.3 \times 10^{-3}$. Glass KZFn1 has an index of refraction very near $n_e$ for crystal quartz ($\Delta n$ from +.002 to -.004) and pretty close to $n_o$ ($\Delta n$ from .012 to .004). Some other glasses are slightly closer to the desired index but have other undesirable properties such as poor transmission or staining. The proposed design solution then, is to make an optical contact between the thinnest birefringent plate and a 1.0 to 1.5 mm thick piece of KZFn1 glass.

Extended Range Coverage

The next area of investigation was to determine whether or not filters could be used over a range of dyes, and if so, with what tolerances on design parameters. The first, more analytical, approach was discouraging, since it indicated a wavelength error dependent on $\phi$, the tuning angle, where $\phi$ is also the adjustment used to compensate for small errors in thickness and parallelism.

By looking at the computer solutions of wavelength vs tuning angle, I was able to quantify the wavelength error for various plate thickness variances after introducing the compensation in the tuning angle, $\phi$. I found that dyes with similar tuning ranges (in $\phi$) should be able to use the same alignment ($\phi$ compensation), and that optimum alignment parameters could be defined. (Refer to Appendix I).

As is evident from the dye tuning curves, an angle range of about 40 degrees is needed to cover all dyes when divided into two groups. Since the minimum $\Delta\lambda$ occurs at $\phi = 5°$, the filter thickness is adjusted to center the group of tuning ranges on 5 degrees.

When that's done, the minimum excursion is produced by allowing it to go negative near the minimum by the same amount it goes positive near the ends of the range (see Figure K). This condition is achieved when $\Delta\lambda$ is zero at $\phi$ about -8 and +18 for nominal plate thicknesses. In practice we will specify wavelengths for filter alignment to $\Delta\lambda = 0$, so that the error curve remains centered on the tuning range even when the plate thickness isn't the nominal value.

These predictions fo filter usefulness in more than one dye have been verified in our laboratory with two 2-plate filters: one aligned in R6G and used with Pyridine 1, and the other aligned with DCM and used with Styryl 9. In both cases, good power and tunability were achieved.

Off-Order Results

One often observes wavelengths not predicted by these equations, particularly when pumped well above threshold. One of the more common situations is to find points half way between tuning curves, when the wavelengths lie near the peak of the dye tuning range. These correspond to half-wave solutions (instead of full wave) which have sufficient gain to get over threshold in spite of the additional loss at one surface of the birefringent plate. This result has been confirmed in single plate filters by noting the change of polarization angle with tuning angle. Since it is largely eliminated by adding a glass plate at Brewster's angle, one would expect not to see these solutions in 2 and 3-plate filters. But in R6G at least, still other lines appear in both single plate and multiple plate filters. They have the correct polarization and are not understood at this time.

Optic Axis Out of the Plane of the Plate

Lovold, et al. (6) make a case for choosing the optic axis other than in the plane of the plate, primarily to get tunability in a certain wavelength range with good modulation depth. Indeed, the broad modulation depths available at some angles look especially appealing.

Application of the equations given in Reference (6) to a specific problem at hand, however, led this author to a different conclusion. I found that the tuning curves in the near infra-red would be much steeper than those shown here for the $\epsilon = 0$ case (as Lovold showed in his paper also), thereby making tuning overly sensitive or requiring a more expensive mechanical assembly to compensate for that. Furthermore, with either of those solutions, wavelength stability might be a significant problem.

Another drawback to using the optic axis at some angles is that the tuning angle ($\alpha$) for minimum sensitivity to plate thickness and parallelism errors stays near -40 degrees ($\phi = 5°$) (refer to Appendix I); therefore, a wide range of optic axis angles are excluded, because the modulation depth is poor in that range of tuning angles. Without claiming to have looked all through the parameter space, I could not find a suitable combination of optic axis = $0°$, good sensitivity to tuning angle, wide range of tolerance to plate errors, and good modulation depth for the wavelength range from 700 to 1000 nm; whereas, I could for optic axis angles near $0°$.

My tentative conclusion, then, is that the conventional choice with the optic axis in the plane of the plates is the preferred one for customary applications.

REFERENCES (1) A. L. Bloom, J. Opt. Soc. Am. 64, 447-452, (1974)

(2) G. Holton and O. Teschke, IEEE J. Quant. Elect. QE-10, 577-579, (1974)

(3) D. R. Preuss and J. L. Gole, Applied Optics 19, 702-710, (1980)

(4) S. M. Mudare and D. C. O'Shea, Applied Optics 22, 640-641, (1983)

(5) L. J. November and F. R. Stauffer, Applied Optics 23, 2333-2341, (1984)

(6) S. Lovold, P.F. Moulton, D.K. Killinger, and N. Menyuk. IEEE J. Quant. Elect. QE-21, 202-208, (1985)

APPENDIX A''' - TOLERANCE ANALYSIS

The following analysis is done for filters with the optic axis in the plane of the filter element. Numerical solutions of the more general case give similar results.

The tolerances in T and $\theta$ are determined such that 2- and 3-plate filters have minimum losses over a wide enough range that sets can used in more than a single dye. The groups of dyes require about a 40 degree tuning range.

The single pass transmitted intensity I, is given by $$I = \cos^2(\delta/2) = \cos^2\left[\frac{\pi \Delta n T}{\lambda \sin\theta}\left(1 - \frac{\sin^2\theta}{n^2}\cos^2\alpha\right)\right] \quad (38)$$

At the $\delta = 0, \pi$ values, the first derivative of I vanishes, so $\quad \Delta I = \frac{1}{2}\left(\frac{d^2 I}{dx^2}\right)\Delta x^2 \quad \text{for} \quad x = \lambda, T, \theta \quad (39)$ $$\frac{dI}{d\lambda} = 2\cos[\quad]\sin[\quad]\frac{[\quad]}{\lambda} \quad (40)$$

and $\quad \dfrac{d^2 I}{d\lambda^2} = 2\cos^2[\quad]\dfrac{[\quad]^2}{\lambda^2} \quad (41)$ $$= \frac{2}{\lambda^2}\left[\frac{\pi \Delta n T}{\lambda \sin\theta}\left(1 - \frac{\sin^2\theta}{n^2}\cos^2\alpha\right)\right]^2 \quad (42)$$

Now, at $\delta = 0, \pi$ values, $\lambda = \dfrac{\Delta n T}{m \sin\theta}\left(1 - \dfrac{\sin^2\theta}{n^2}\cos^2\alpha\right) \quad (43)$ so $\quad \dfrac{d^2 I}{d\lambda^2} = \dfrac{2}{\lambda^2}(\pi m)^2 \quad (44)$ therefore, $\quad \boxed{\Delta I = \left(\dfrac{\pi m}{\lambda}\right)^2 (\Delta\lambda)^2} \quad (45)$ or $\quad \boxed{\Delta\lambda = \dfrac{\sqrt{\Delta I}}{\pi m}\lambda} \quad (46)$ Similarly, $\quad \Delta I = \left(\dfrac{\pi m}{T}\right)^2 (\Delta T)^2 \quad (47)$ or $\quad \Delta T = \dfrac{\sqrt{\Delta I}}{\pi m} T = \left(\dfrac{T}{m}\right)\dfrac{\sqrt{\Delta I}}{\pi} \quad (48)$ and $$\Delta\theta = \sqrt{\frac{\Delta I}{m\pi}} \left\{ \frac{1 - \frac{\sin^2\theta}{n^2}\cos^2\alpha}{\cot\theta\left(1 + \frac{\sin^2\theta}{n^2}\cos^2\alpha\right)} \right\} \quad (49)$$

These equations, however, give more stringent limits on T and $\theta$ than required, because those errors can be compensated to first order by an offset in $\alpha$ (or $\phi$), the tuning angle. Because the analysis of the second order terms gets quite messy, the remaining analysis has been done numerically by computer where it was more convenient to calculate $\Delta\lambda$ vs T and $\theta$ as a function of the tuning angle.

Numerical Limits.

Experimental evidence suggests that the double pass transmission should be $>.99$, so the single pass intensity will be $>.995$, and the largest $\Delta I = .005$.

Then $\Delta\lambda = \frac{.071\lambda}{\pi m}$ or $\frac{\lambda}{44m}$ $\quad (50)$ For the 2nd plate, assumed to be 4T, $\Delta\lambda = .39$ nm at $\lambda = 420$ nm $\quad (51)$ $\Delta\lambda = 1.58$ nm at $\lambda = 840$ nm $\quad (52)$ and for the 3rd plate (16T), $\Delta\lambda = .098$ nm at $\lambda = 420$ nm $\quad (53)$ $\Delta\lambda = .39$ nm at $\lambda = 840$ nm $\quad (54)$

Tolerance on T

Calculate $\Delta\lambda$ for T and T+$\Delta$T, where $\Delta$T corresponds to the thickness error in the 2nd plate (because $\lambda$ and $\Delta I/\Delta T$ are both proportional to T/m, the allowed absolute error in the 3rd plate will be the same as in the 2nd plate). Then introduce a fixed offset in the tuning angle $\phi$ in the calculations for $\lambda$(T+$\Delta$T). This can be done quite easily on the computer by successive approximations. Once the first order correction is made to give the smallest mean difference between the two sets of calculated wavelengths, a parabolic error curve remains. The offset angle can be adjusted to balance the positive and negative $\Delta\lambda$ values to give the maximum tuning range within the specified $\Delta\lambda$.

Observe that the $\Delta\lambda$ values go inversely with m, but the $\lambda$ term in (49) still makes the short wavelength region most sensitive. In Figure K we assumed a 6 $\mu$m error in plate thickness, and we see that that gives about 1/2 of the maximum allowed error in $\lambda$.

The actual alignment procedure will be to set up the single plate filter at $\phi = -8°$ or $+18°$, then adjust the 2nd (& 3rd) plate for zero wavelength error. Previous technique did this near the peak of the dye curve, which leads to larger errors at the wings of the tuning curves. A further refinement may be to determine the wavelengths corresponding to $-8°$ and $+18°$ and specify those as alignment wavelengths; that should make allowance for variations in the thin plate thickness.

Tolerance on $\theta$

With a similar approach I calculated $\lambda$'s for slightly different input angles, $\theta$. Subtracting those results from the $\lambda$'s at the nominal $\theta$, I generate an error curve. Again, adding a fixed offset angle can eliminate the first order error term, and the resulting parabola is centered just where the $\Delta\lambda(\Delta T,\phi)$ curve is. The errors at m = 6 are 1/2 those for m = 3, so again the most sensitive case is at short wavelength. In Figure L, error curves are generated with 6' and 24' variations in θ, corresponding to 3rd plate and 2nd plate errors, respectively. As before, the results are about 1/2 of allowed values for $\Delta I$ = .005.

Summary

A combination of analytical and numerical analysis gives reasonable and achievable tolerances on the optical and machined parts. Since errors in both thickness and angle are anticipated, since they add algebraically, and since the same mechanism is used to eliminate first order effects, the tolerances assumed in these calculations should give acceptable results even when both errors add with the same sign.

If a tuning range other than 40 degrees is desired, the same principles for centering the error curve apply, but the zeros will of course have to be different.

APPENDIX II - CRITERIA FOR DESIGNING BIREFRINGENT FILTERS

1. Thickness of thin plate chosen to allow full tuning on a single order.

2. Thickness adjusted to center the tuning range at +5 degrees to minimize power loss during tuning due to thickness error in 2nd and 3rd plates.

3. Thickness tolerance chosen to keep power loss during tuning within acceptable limits and within production capabilities.

4. Parallelism of plates held to tolerances giving the same or smaller power loss during tuning as maximum thickness errors.

5. Wavelengths chosen for multiple plate alignment to center the error curve on the tuning range of one or more dyes. Nominal tuning angles to do that are -8 and +18 degrees.

6. Optical c-axis chosen in the plane of the filter.

7. Thin plate optically contacted to a non-birefringent glass to avoid or minimize interference effects.

8. One or more non birefringent Brewster plates may be used to eliminate jumps to half-order wavelengths near the ends of the tuning range.

9. Thickness chosen to keep Free Spectral Range (FSR) from being too small for a desired tuning range; i.e., no more than one curve overlapping at the same tuning angle within a range.

What is claimed is:

1. A tuning apparatus for a dye laser having a resonator cavity with a beam of light therein comprising:
a tuning plate of birefringent material in the path of said beam of light, said birefringent material having an optic axis and having a thickness defined according to the following equation:

$$w = \frac{BT}{m \sin(Th)} \left[ 1 - \frac{\sin^2(Th)}{2n^2} (1 + \sin(2 Ph)) \right]$$

where,
$w$ = the wavelength of light which will have minimum loss for conditions defined by the values of the variables in said equation;
$B$ = the birefringence of the plate as defined by the difference in the indices of refraction along two principal displacement directions in the anisotropic material at the wavelength $w$;
$T$ = the thickness of the birefringent plate;
$m$ = the integer or order number indicating the number of full wavelengths of phase retardation light will experience in passing through said birefringent plate;

Th = the angle of incidence of said light beam on said birefringent plate;

n = the average index of refraction of the birefringent material at the wavelength w; and, Ph = the tuning angle equal to alpha plus pi/4 where alpha is the angle between the projection of said optic axis of the birefringent plate on a surface of said birefringent plate upon which said beam of light is incident to the plane of incidence containing both the direction of propagation of the incident ray and the normal to said surface;

said thickness, T, selected such that a single order tuning curve covers a selected range of wavelengths of interest within a predetermined range of said tuning angles, Ph, where each tuning curve relates the wavelength of light experiencing minimum loss to a corresponding tuning angle Ph which causes said wavelength to suffer minimum loss, and further comprising a means for imposing losses on any light in said light beam not having the polarization of light which can pass through said birefringent tuning plate without experiencing substantial losses.

2. The apparatus of claim 1 wherein said thickness, T, is chosen such that the tuning angle stays smaller than a tuning angle at which tuning anomalies in the form of discontinuities in a tuning function relating the wavelength of lasing to said tuning angle occur.

3. The apparatus of claim 1 wherein the thickness, T, is chosen such that the sensitivity of the wavelength w to changes in the tuning angle Ph is between predetermined levels.

4. The apparatus of claim 1 wherein the thickness T of said tuning plate is chosen so that a single order tuning curve results which covers a selected tuning range and allows substantially linear tuning over said selected tuning range.

5. The apparatus of claim 1 wherein the thickness T of the plate is chosen to be 0.297 millimeters plus or minus 0.010 millimeters.

6. The apparatus of claim 1 comprising the further improvement of at least one nonbirefringent layer of transparent material in optical contact with said birefringent tuning plate and having an index of refraction which matches the index of refraction of said birefringent tuning plate so as to reduce tuning discontinuities caused by interference effects.

7. The apparatus of claim 6 wherein said nonbirefringent layer of transparent material covers both surfaces of said birefringent tuning plate upon which said beam of light is incident.

8. The apparatus of claim 7 wherein said nonbirefringent layer of transparent material is KZFn1 glass.

9. The apparatus of claim 8 wherein said KZFn1 glass is between 0.5 and 2.0 millimeters thick.

10. The apparatus of claim 6 wherein said nonbirefringent layer of transparent material is KZFn1 glass.

11. The apparatus of claim 10 wherein said KZFn1 glass is between 0.5 and 2.0 millimeters thick.

12. A dye laser comprising:
a dye jet;
means for exciting said dye jet so as to cause lasing activity to generate a resonating beam of laser light;
a resonator cavity including at least two mirrors and defining an axis for said resonating light beam such that said light beam passes through said dye jet;
a first tuning plate of birefringent material having a predetermined thickness, T, chosen so that a single mode curve in the family of tuning curves covers a specific range of desired lasing wavelengths, said single mode curve representing the solutions for a predetermined range of tuning angles and a specific integer number of wavelengths of phase retardation for light passing through said first tuning plate of a predetermined tuning equation relating said first tuning angle to a corresponding wavelength of lasing and wherein said family of tuning curves represent the solutions of said tuning equation for different integer numbers of wavelengths of phase retardation, and said first tuning plate being located such that light beam resonating in said cavity along said axis passes through said first tuning plate and makes Brewster's angle with the normal to the surface of said first plate;
at least a second tuning plate of birefringent material having a thickness which is an integer multiple of the thickness, T, of said first tuning plate and located such that said light beam resonating in said cavity along said axis passes through said second tuning plate, and oriented such that light incident on said second tuning plate makes Brewster's angle with said first tuning plate, and having an optic axis which is parallel with the optic axis of said first tuning plate, and
further comprising means for imposing losses on light resonating in said resonant cavity having other than a selected polarization.

13. The apparatus of claim 8 further comprising a third tuning plate of birefringent material having a thickness which is an integer multiple of the thickness of said second tuning plate and situated along said axis in said resonator cavity such that said light beam resonating in said cavity must pass through said third tuning plate, and having an optic axis which is substantially parallel to the optic axes of said first and second tuning plates, and oriented so that the surfaces of said third tuning plate upon which, said resonating light beam is incident form Brewster's angle between said axes and the normals to said surfaces.

14. The apparatus of claim 12 wherein each said birefringent tuning plate has an optic axis and where the thickness, T, is selected according to the following tuning equation:

$$w = \frac{B\,T}{m \sin(Th)} \left[ 1 - \frac{\sin^2(Th)}{2\,n^2} (1 + \sin(2\,Ph)) \right]$$

where
w = the wavelength of light which will have minimum loss for conditions defined by the values of the variables in said equation;
B = the birefringent of the first tuning plate as defined by the difference in the indices of refraction along the two principal displacement directions in the anisotropic material of said first tuning plate;

T = the thickness of the birefringent first tuning plate;

m = the integer or order number indicating the number of full wavelengths of phase retardation light will experience in passing through said birefringent first tuning plate;

Th = the angle of incidence of said light beam on a surface of said first tuning plate;

n = the average index of refraction of the birefringent material of said tuning plates; and Ph = a tuning angle equal to alpha plus pi/4 where alpha is the angle between the projection of the optic axis of the birefringent first tuning plate on a surface of said birefringent first tuning plate upon which said light beam is incident to the plane of incidence containing both the axis of said resonating light beam and the normal to said surface upon which said light beam is incident;

said thickness, T, being chosen such that a single order tuning curve covers the desired range of wavelengths of interest within a predetermined range of tuning angles, Ph, where each tuning curve defines the relationship between the wavelength experiencing minimum loss to tuning angle, Ph, based upon said tuning equation and the values of the variables in said tuning equation.

15. The apparatus of claim 14 wherein the thickness, T, is chosen such that the sensitivity of the wavelength w to changes in the tuning angle Ph between predetermined levels.

16. The apparatus of claim 14 wherein the thickness, T, of the plate is chosen so that the single order tuning curve which covers the desired tuning range allows tuning which is substantially linear over the tuning range of interest.

17. A dye laser comprising:
a means for causing a dye jet and to cause said dye jet to lase to generate light;
a resonator cavity including at least two mirrors and defining an axis for causing said light generated by said dye jet to resonate between said two mirrors which passes through said dye jet;
a first tuning plate of birefringent material having an optic axis having a predetermined thickness and located such that light resonating in said cavity along said axis passes through, said first tuning plate and makes Brewster's angle with the normal to the surface of said first plate;
at least a second tuning plate of birefringent material having a thickness which is an integer multiple of the thickness of said first tuning plate and located such that light resonating in said cavity along said axis passes through said second tuning plate and oriented such that light, incident on said second tuning plate makes Brewster's angle with said first tuning plate, and having an optic axis which is parallel with the optic axis of said first tuning plate, and
further comprising means for imposing losses on any light resonating in said resonator cavity not having p-polarization.

18. In a dye laser resonator cavity having a dye jet and at least one birefringent tuning plate oriented at Brewster's angle to a beam of light passing through said cavity, wherein said birefringent tuning plate allows light from said beam of light having a selected range of wavelengths and a selected polarization to pass through said birefringent tuning plate without substantial losses but imposes losses on light in said beam having wavelengths outside said selected range of wavelengths or having polarization other than said selected polarization, the improvement comprising a polarizer plate through which said beam of light passes and having an orientation and composition such that only light in said beam having said selected polarization passes through said polarizer plate without substantial losses, while light in said beam having other polarization suffers losses in passing through said polarizing plate.

19. A tuning apparatus for a dye laser having a resonator cavity with a beam of light therein comprising:
a tuning plate of birefringent material in the path of said beam of light, said birefringent material having an optic axis and having a thickness defined according to the following equation:

$$w = \frac{BT}{m \sin(Th)} \left[ 1 - \frac{\sin^2(Th)}{2 n^2} (1 + \sin(2 Ph)) \right]$$

where, w = the wavelength of light which will have minimum loss for conditions defined by the values of the variables in said equation;

B = the birefringent of the plate as defined by the difference in the indices of refraction along two principal displacement directions in the anisotropic material at the wavelength w;

T = the thickness of the birefringent plate;

m = the integer or order number indicating the number of full wavelengths of phase retardation light will experience in passing through said birefringent plate;

Th = the angle of incidence of said light beam on said birefringent plate;

n = the average index of refraction of the birefringent material at the wavelength w; and, Ph = the tuning angle equal to alpha plus pi/4 where alpha is the angle between the projection of said optic axis of the birefringent plate on a surface of said birefringent plate upon which said beam of light is incident to the plane of incidence containing both the direction of propagation of the incident ray and the normal to said surface;

said thickness, T, selected such that a single order tuning curve covers a selected range of wavelengths of interest within a predetermined range of said tuning angles, Ph, where each tuning curve relates the wavelength of light experiencing minimum loss to a corresponding tuning angle Ph which causes said wavelength to suffer minimum loss;

at least one layer of nonbirefringent glass having an index of refraction which matches the index of refraction of said birefringent tuning plate and in optical contact with at least one surface of said birefringent tuning plate through which said beam of light passes; and further comprising a means for imposing losses on any light in said light beam not having the polarization of light which can pass through said birefringent tuning plate without experiencing substantial losses.

20. The apparatus of claim 19 wherein said thickness, T, is chosen such that the tuning angle stays smaller than a tuning angle at which tuning anomalies in the form of discontinuities in a tuning function relating the wavelength of lasing to said tuning angle occur, and wherein said nonbirefringent glass covers at least two surfaces of said birefringent tuning plate through which said beam of light passes.

21. The apparatus of claim 19 wherein the thickness, T, is chosen such that the sensitivity of the wavelength w to changes in the tuning angle Ph is between predetermined levels, and wherein said nonbirefringent glass is KZFn1 glass.

22. The apparatus of claim 19 wherein the thickness T of said tuning plate is chosen so that a single order tuning curve results which covers a selected tuning range and allows substantially linear tuning over said selected tuning range, and wherein said nonbirefringent glass is KZFn1 glass which covers at least two surfaces through which said beam of light passes and has a thickness sufficient to eliminate interference effects.

23. The apparatus of claim 17 wherein the thickness T of the plate is chosen to be 0.297 millimeters plus or minus 0.010 millimeters, and wherein said nonbirefringent glass is KZFn1 glass having a thickness of between 0.5 and 2.0 millimeters.

* * * * *

UNITED STATES PATENT AND TRADEMARK OFFICE
CERTIFICATE OF CORRECTION

PATENT NO. : 4,914,664
DATED : April 3, 1990
INVENTOR(S) : Ben Woodward

It is certified that error appears in the above-identified patent and that said Letters Patent is hereby corrected as shown below:

Column 1, line 48, "that" should read --than--.

Column 2, line 12, "other" should read --others--.

Column 3, line 61, "be not be" should read --not be--.

Column 7, line 15, "thickness" should read --thicknesses--.

Column 8, line 15, "illustrate" should read --illustrates--.

Columns 25-26, insert --Appendix A-- before "Birefringent".

Columns 29-30, "Figures C and D" should read --Figures 6 and 7--.

Columns 33-34, 4th line from the bottom, "Appendix I" should read --Appendix A'''--.

Columns 35-36, insert Figures E, F, G, H, I, K and L before "Off-Order Results".

UNITED STATES PATENT AND TRADEMARK OFFICE
CERTIFICATE OF CORRECTION

PATENT NO. : 4,914,664

DATED : April 3, 1990

INVENTOR(S) : Ben Woodward

It is certified that error appears in the above-identified patent and that said Letters Patent is hereby corrected as shown below:

Column 35-36, 11th line from the buttom, "Appendix I" should read --Appendix A'''--.

Signed and Sealed this

First Day of December, 1992

*Attest:*

DOUGLAS B. COMER

*Attesting Officer*     *Acting Commissioner of Patents and Trademarks*